United States Patent
Aranha et al.

(10) Patent No.: US 8,868,504 B2
(45) Date of Patent: Oct. 21, 2014

(54) DATABASE SYSTEM WITH ACTIVE STANDBY AND NODES

(75) Inventors: Rohan Aranha, Redwood City, CA (US); Paul Tuck, Wanborough Swindon (GB); John Ernest Miller, Los Altos, CA (US); Chih-Ping Wang, Palo Alto, CA (US); Marie-Anne Neimat, Atherton, CA (US); Susan Sokeng Cheung, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 448 days.

(21) Appl. No.: 12/030,094

(22) Filed: Feb. 12, 2008

(65) Prior Publication Data
US 2008/0222159 A1   Sep. 11, 2008

Related U.S. Application Data

(60) Provisional application No. 61/026,090, filed on Feb. 4, 2008, provisional application No. 60/905,751, filed on Mar. 7, 2007.

(51) Int. Cl.
G06F 17/30 (2006.01)
G06F 17/00 (2006.01)

(52) U.S. Cl.
CPC .............. *G06F 17/30289* (2013.01)
USPC ............ 707/640; 707/703; 707/812

(58) Field of Classification Search
USPC .................. 707/999.005, 652, 648
See application file for complete search history.

(56) References Cited

U.S. PATENT DOCUMENTS

| | | | |
|---|---|---|---|
| 5,095,421 A | | 3/1992 | Freund |
| 5,123,099 A | * | 6/1992 | Shibata et al. ............ 711/120 |
| 5,241,675 A | | 8/1993 | Sheth et al. |
| 5,263,156 A | | 11/1993 | Bowen et al. |
| 5,287,496 A | | 2/1994 | Chen et al. |
| 5,333,265 A | | 7/1994 | Orimo et al. |

(Continued)

FOREIGN PATENT DOCUMENTS

EP   0 501 180 A   9/1992

OTHER PUBLICATIONS

Oracle, "Replication-TimesTen to TimesTen", Sep. 28, 2006, http://web.archive.org/web/20060928122432/www.oracle.com/technology/products/timesten/pdf/ds/ds_timesten_replication.pdf.*

(Continued)

*Primary Examiner* — Usmaan Saeed
*Assistant Examiner* — Brittany N Allen
(74) *Attorney, Agent, or Firm* — Hickman Palermo Truong Becker Bingham Wong LLP

(57) ABSTRACT

A system includes an active node and a standby node and zero or more replica nodes. Each of the nodes includes a database system, such as an in-memory database system. Client updates applied to the active node are written through to the standby node, and the standby node writes the updates through to a primary database and updates the replica nodes. Commit ticket numbers tag entries in transaction logs and are used to facilitate recovery if either of the active node or the standby node fails. Updates applied to the primary database are autorefreshed to the active node and written through by the active node to the standby node which propagates the updates to the replica nodes. Bookmarks are used to track updated records of the primary database and are used to facilitate recovery if either of the active node or the standby node fails.

12 Claims, 10 Drawing Sheets

(56) References Cited

U.S. PATENT DOCUMENTS

| | | | |
|---|---|---|---|
| 5,333,316 | A | 7/1994 | Champagne et al. |
| 5,355,477 | A | 10/1994 | Strickland et al. |
| 5,369,757 | A | 11/1994 | Spiro et al. |
| 5,388,196 | A | 2/1995 | Pajak et al. |
| 5,423,037 | A | 6/1995 | Hvasshovd |
| 5,454,102 | A | 9/1995 | Tang et al. |
| 5,553,279 | A | 9/1996 | Goldring |
| 5,555,404 | A | 9/1996 | Torbj.oslashed.rnsen et al. |
| 5,559,991 | A | 9/1996 | Kanfi |
| 5,566,315 | A | 10/1996 | Milillo et al. |
| 5,574,906 | A | 11/1996 | Morris |
| 5,581,753 | A | 12/1996 | Terry et al. |
| 5,603,024 | A | 2/1997 | Goldring |
| 5,613,113 | A | 3/1997 | Goldring |
| 5,806,076 | A | 9/1998 | Ngai et al. |
| 5,870,758 | A | 2/1999 | Bamford et al. |
| 5,924,096 | A | 7/1999 | Draper et al. |
| 5,951,695 | A * | 9/1999 | Kolovson ............... 714/16 |
| 5,956,731 | A | 9/1999 | Bamford et al. |
| 5,974,427 | A | 10/1999 | Reiter |
| 5,983,277 | A | 11/1999 | Heile et al. |
| 5,991,771 | A | 11/1999 | Falls et al. |
| 6,014,669 | A | 1/2000 | Slaughter et al. |
| 6,122,630 | A * | 9/2000 | Strickler et al. ............... 1/1 |
| 6,192,377 | B1 | 2/2001 | Ganesh et al. |
| 6,298,319 | B1 | 10/2001 | Heile et al. |
| 6,353,835 | B1 | 3/2002 | Lieuwen |
| 6,393,485 | B1 | 5/2002 | Chao et al. |
| 6,502,133 | B1 | 12/2002 | Baulier et al. |
| 6,516,327 | B1 | 2/2003 | Zondervan et al. |
| 6,574,717 | B1 | 6/2003 | Ngai et al. |
| 6,691,139 | B2 | 2/2004 | Ganesh et al. |
| 6,839,751 | B1 | 1/2005 | Dietz et al. |
| 7,024,656 | B1 | 4/2006 | Ahad |
| 7,076,508 | B2 | 7/2006 | Brourbonnais et al. |
| 7,222,136 | B1 | 5/2007 | Brown et al. |
| 7,287,034 | B2 | 10/2007 | Wong et al. |
| 7,290,017 | B1 | 10/2007 | Wang et al. |
| 7,464,113 | B1 | 12/2008 | Girkar et al. |
| 7,627,612 | B2 | 12/2009 | Ahal et al. |
| 7,644,084 | B2 | 1/2010 | Rapp |
| 7,734,580 | B2 | 6/2010 | Lahiri et al. |
| 7,966,293 | B1 | 6/2011 | Owara et al. |
| 8,468,320 | B1 | 6/2013 | Stringham |
| 2002/0116404 | A1* | 8/2002 | Cha et al. ............... 707/202 |
| 2002/0133508 | A1 | 9/2002 | Larue et al. |
| 2002/0165724 | A1 | 11/2002 | Blankesteijn |
| 2004/0193574 | A1 | 9/2004 | Suzuki |
| 2005/0289198 | A1* | 12/2005 | Todd ............... 707/204 |
| 2006/0004691 | A1 | 1/2006 | Sifry |
| 2006/0212481 | A1 | 9/2006 | Stacey et al. |
| 2007/0038689 | A1 | 2/2007 | Shinkai |
| 2007/0083505 | A1 | 4/2007 | Ferrari et al. |
| 2007/0226277 | A1 | 9/2007 | Holenstein et al. |
| 2007/0239661 | A1* | 10/2007 | Cattell et al. ............... 707/2 |
| 2008/0228835 | A1 | 9/2008 | Lashley et al. |
| 2008/0256143 | A1 | 10/2008 | Reddy et al. |
| 2009/0268903 | A1 | 10/2009 | Bojinov et al. |
| 2010/0036843 | A1 | 2/2010 | MacNaughton et al. |
| 2010/0145909 | A1 | 6/2010 | Ngo |
| 2011/0087637 | A1 | 4/2011 | Sundaram et al. |
| 2011/0145207 | A1 | 6/2011 | Agrawal et al. |
| 2011/0231362 | A1 | 9/2011 | Attarde et al. |
| 2012/0054533 | A1 | 3/2012 | Shi et al. |
| 2012/0323849 | A1 | 12/2012 | Garin et al. |
| 2014/0059020 | A1 | 2/2014 | Hu et al. |

OTHER PUBLICATIONS

Oracle, "TimesTen to TimesTen Replication Guide", Dec. 8, 2006, Release 6.0, pp. 17, 50, 130, 141, 146, http://web.archive.org/web/20061208112231m_1/download-west.oracle.com/otn_hosted_doc/timesten/603/TimesTen-Documentation/replication.pdf.*

Oracle, "Oracle TimesTen In-Memory Database API and SQL Reference Guide", Dec. 8, 2006, Release 6.0, pp. 352-353, http://web.archive.org/web/20061208112015/download-west.oracle.com/otn_hosted_doc/timesten/603/TimesTen-Documentation/tt_ref.pdf.*

Oracle, "Cache Connect to Oracle", Nov. 16, 2006, http://web.archive.org/web/20061116163257/www.oracle.com/technology/products/timesten/pdf/ds/ds_timesten_cache.pdf.*

The TimesTen Team, "Mid-Tier Caching: The TimesTen Approach", 2002, ACM.*

Oracle, "Oracle TimesTen In-Memory Database Architectural Overview", Release 6.0, Oct. 26, 2006, http://web.archive.org/web/20061026030955/http://download-west.oracle.com/otn_hosted_doc/timesten/603/TimesTen-Documentation/arch.pdf.*

The TimesTen Team, "High Performance and Scalability through Application-Tier, In-Memory Management", Proceedings of $26^{th}$ International Conference on Very Large Databases, Cairo, Egypt, 2000, pp. 677-680.

Bornhovd et al., "Adaptive Database Caching with DBCache", IEEE 2004, pp. 11-18.

Harder Theo et al., "Database Caching—Towards a Cost Model for Populating Cache Groups," ADBIS 2004, LNCS 3255, A. Benczur, J. Demetrovics, 15 pages.

Aronovich et al., "The Design of a Similarity Based Deduplication System", SYSTOR, 2009, 14 pages.

Forman et al., "Efficient Detection of Large-Scale Redundancy in Enterprise File Systems", dated Jan. 2009, 8 pages.

Bober, Paul M., et al., "On Mixing Queries and Transactions via Multiversion Locking", Computer Sciences Department, University of Wisconsin, 1992, pp. 535-545.

Mohan, C., et al., "Efficient and Flexible Methods for Transient Versioning of Records to Avoid Locking by Read-Only Transactions", XP000393583, IBM Almaden Research Center, publication date Feb. 6, 1992, pp. 124-133.

Claims, EP02731965.6, 1 page.

European Patent Office, "Communication—European Search Report", Application No. 07003358.4-2201, dated May 18, 2007, 8 pages.

Teschke, et al., "Concurrent Warehouse Maintenance Without Comprising Session Consistency", University of Erlangen-Nuremberg., Pub 1998, 10 pages.

Vassilakis et al., "Implementation of Transaction and Concurrency Control Support in a Temporal DBMS", Department of Information Systems, University of Athens, vol. 23 No. 5. Pub 1998, 16 pages.

* cited by examiner

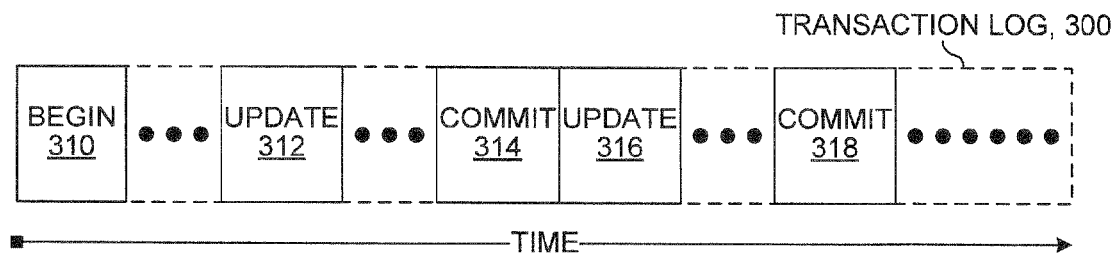
Fig. 3A
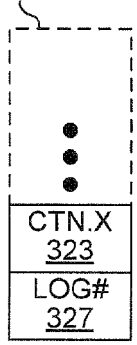
Fig. 3B
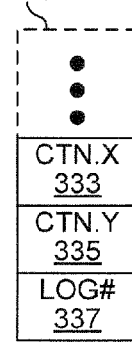
Fig. 3C
Fig. 3D

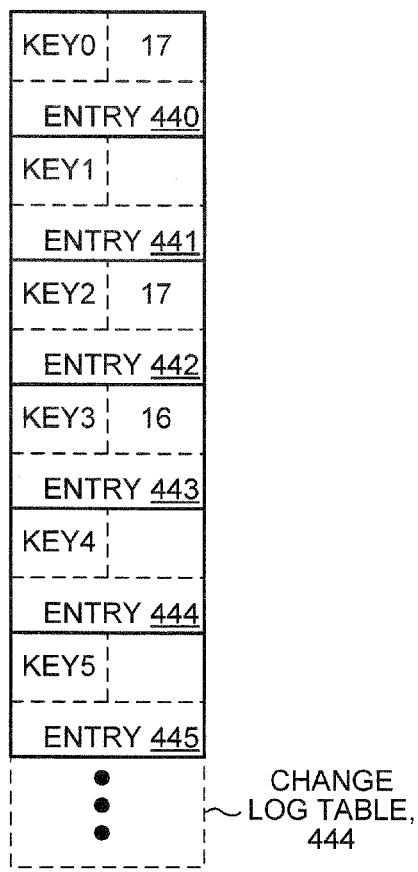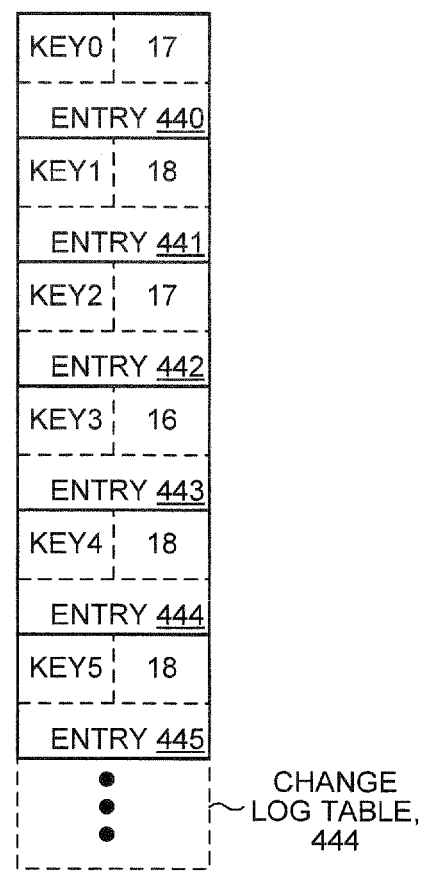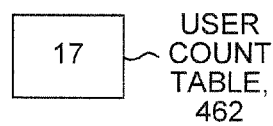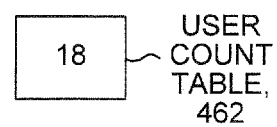
Fig. 5A  Fig. 5B

DATABASE SYSTEM WITH ACTIVE STANDBY AND NODES

CROSS REFERENCE TO RELATED APPLICATIONS

Priority benefit claims for this application are made in the accompanying Application Data Sheet (if any). To the extent permitted by the type of the instant application, this application claims priority to the following application(s):

U.S. Provisional Application Ser. No. 60/905,751, filed Mar. 7, 2007, first named inventor Tirthankar Lahiri, and entitled MAIN-MEMORY DATABASES and U.S. Provisional Application Ser. No. 61/026,090 filed on Feb. 4, 2008, entitled DATABASE SYSTEM WITH DYNAMIC DATABASE CACHING AND DATABASE SYSTEM WITH ACTIVE AND STANDBY NODES and are both incorporated by reference in their entirety This application is related to the following application(s) filed simultaneously herewith and which are all owned by the owner of the instant application, and to the extent permitted by the type of the instant application, this application incorporates by reference for all purposes the following application(s):

U.S. Non-Provisional Application Ser. No. 12/030,113, first named inventor Chi Hoang, and entitled DATABASE SYSTEM WITH DYNAMIC DATABASE CACHING.

FIELD OF INVENTION

The invention relates to the field of data processing systems. More specifically, the invention relates to reliability and/or availability techniques used for database management systems.

A portion of the disclosure of this patent document contains material subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

A database is a collection of related data items. To perform various tasks, users access data items stored in the database via transactions. A database management system supports transactions to access the data items stored in the database, and uses data structures such as indices to manage access to the data items.

Disk-based Relational Database Management Systems (RDBMS) use disk storage to store and access databases. Much of the work that is done by a conventional, disk-optimized RDBMS is done under the assumption that the data items and related data structures primarily reside on disk. Optimization algorithms, buffer pool management, and indexed retrieval techniques are designed based on this fundamental assumption. One problem with disk storage is that access to the data items and to the data structures is relatively slow.

Even when an R-DBMS has been configured to hold all of its data items and data structures in main memory, its performance is hobbled by assumptions of disk-based data residency. These assumptions cannot be easily reversed because they are hard-coded in processing logic, indexing schemes, and data access mechanisms.

In-memory relational database systems (also called main-memory relational database systems) are deployed, such as in the application tier, and operate in physical memory using standard Structured Query Language (SQL) interfaces. By managing data in memory and optimizing the data structures and data access algorithms, in-memory database systems are able to provide improved responsiveness and throughput compared even to fully cached, disk-based RDBMS. For example, an in-memory database system is designed with the knowledge that the data items reside in main memory, and is thus able to take more direct routes to the data items, reducing lengths of code paths, and simplifying algorithms and data structures.

When the assumption of disk-residency is removed, complexity is reduced. The number of machine instructions drops, buffer pool management disappears, extra copies of the data items and/or data structures are not needed, and indices shrink. The database design becomes simpler and more compact, and requests for data items are executed faster. Some in-memory database systems provide persistent (non-volatile) storage of data, such as by archiving data from main memory to disk, or by maintaining a non-volatile transaction log. Unlike disk-based RDBMS, however, some in-memory database systems do not guarantee persistence of all data, such as by not gating a commit of a transaction by the non-volatile logging of the transaction.

In-memory database systems are sometimes less reliable than disk-based systems because of factors such as: the storage (such as main memory) is volatile; an environment in which the in-memory database systems are deployed is more hostile; and a type of hardware platform on which the in-memory database systems run is less reliable. Techniques such as data replication and using active and standby systems are used to increase reliability and availability. In one form of replication, write-through schemes allow modifications to an in-memory database system to be "written through" to a backend (primary) database system. Write-through to a backend database system thus improves data persistence, since if the in-memory database system fails, data that has been written through remains in the backend database system and is retrievable from there. However, it is desirable to have techniques with both improved data persistence and improved data availability, so that a failure (such as a crash) of a single in-memory database system does not (even temporarily) cause a loss of access to the data.

BRIEF DESCRIPTION OF THE DRAWINGS

FIG. 3A illustrates selected details of an embodiment of a transaction log.

FIGS. 3B and 3C illustrate selected details of embodiments of respective commit records on an active node and on a standby node.

FIG. 3D illustrates selected details of an embodiment of database tables used with active writethrough.

FIGS. 5A and 5B illustrate an example of use of a change log table and of a user count table.

INTRODUCTION

Overview

Figure 1A:
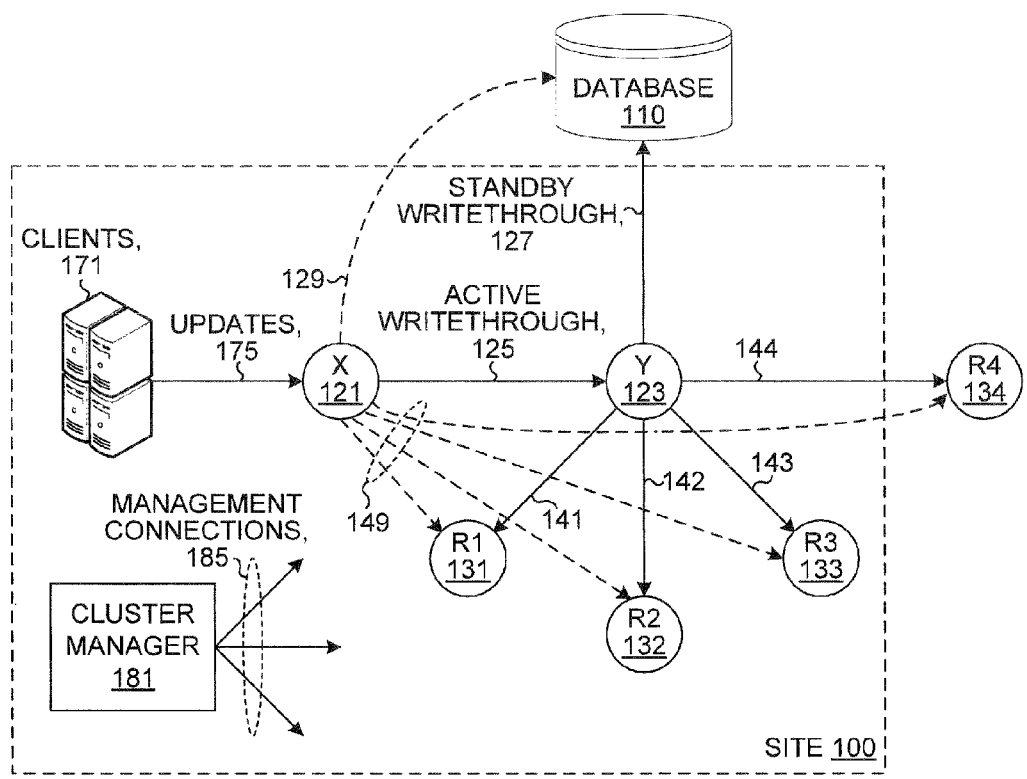
FIG. 1A illustrates selected details of an embodiment of a system with active and standby nodes highlighting writethrough connections.

A system includes an active node (such as node X 121 of FIG. 1A), a standby node (such as node Y 123 of FIG. 1A), and zero or more replica nodes (such as nodes R1 131, R2 132, R3 133, and R4 134 of FIG. 1A). Each of the nodes includes a respective database system, such as an in-memory database system. In some embodiments and/or usage scenarios, the system includes a backend (primary) database system (such as database 110 of FIG. 1A). Any of these database systems are optionally and/or selectively different database systems from each other and/or different versions of a same database system. According to various embodiments, at least some of the nodes include and/or act as one or more of: a front-end for at least some updates applied to the backend database system; a subset of the contents of the backend database system; and a cache of or for the backend database system. In some embodiments and/or usage scenarios, using nodes including an in-memory database system in conjunction with a backend database system provides one or more of: higher access bandwidth; shorter access latencies; and reduced cost per query.

In various embodiments and/or usage scenarios, the backend database system is a primary database system (such as an Enterprise Information System). In some embodiments, a middle-tier database system includes the active node, the standby node, and the replica nodes. The middle-tier database system isolates the primary database system from large amounts of traffic, such as internet traffic, by providing a distributed copy of at least some of the data in the primary database system.

In various embodiments, the respective database systems on each of the nodes organize at least some of the data in cache groups. Cache groups provide a way to organize one or more tables of the backend database system so that related data (such as from multiple tables sharing a key) is movable to and/or from the nodes as a unit. That is, some or all of the one or more tables of the backend database system (such as selected rows and/or columns and/or other selected portions) are replicated on one or more of the nodes, and cache groups define a unit of the replication, such as a row of each of the tables, the rows having a same key. In further embodiments, cache groups have properties specifying features of their operation, such as how data of the cache groups is loaded into the respective database of a particular one of the nodes, how data of the cache groups is aged/removed from the respective database of the particular node, and how data of the cache groups is updated (for example, by writethrough or by autorefresh). According to various embodiments, properties of cache groups are one or more of: configurable separately on each of the nodes; configurable separately on the backend database system; and global across one or more of the nodes and the backend database system.

In some embodiments, a particular cache group (or, in further embodiments, a particular table) is configurable to be updated by one or more of direct updates (such as from a client), writethrough updates (such as from another one of the nodes), and autorefresh updates (such as from a backend database system). In other embodiments, a particular cache group (or, in further embodiments, a particular table) is configurable to be updated by only one of direct updates, writethrough updates, and autorefresh updates.

Providing the active node and the standby node increases availability in that either one of the active node or the standby node can fail, such as by crashing, and the surviving node is able to continue operating, in some cases taking over functions and/or operations of the failed node. According to various embodiments, failure of a node is one or more of: complete, such as by the node crashing; a process failure, such as a critical process or critical agent of the node failing; a communication failure, such as a network connection of the node failing; a freeze, such as the node functioning, but becoming unresponsive; and any other type of failure that renders the node wholly or partly unable to provide intended functions of the node. Recovery from the failure depends on a type of the failure, and uses various recovery measures, such as rebooting the failed node and restarting a failed process of the node, to restore basic functionality of the node. Additional recovery techniques, as described elsewhere herein, are used to synchronize the node (for example, to ensure that contents of the respective database of the node are up-to-date), and to return the node to operation.

To provide the increased availability without (or with minimal) loss of data, updates (such as transactions and/or commits of transactions) to data stored in the system are propagated to all of the nodes, and to the backend database system if present. In a first example, updates applied to the active node are written through to the standby node and to the replica nodes (if any), as well as to the backend database system. In a second example, updates applied to the backend database system are propagated to the active node by an autorefresh technique, and are then written through to the standby node and to the replica nodes (if any).

In some usage scenarios, providing replica nodes increases the bandwidth of the system in that a larger number of nodes having copies of the data are able to support more read-only accesses (for example, queries). In various embodiments and/or usage scenarios, the active node and/or the standby node support read-only access to the data.

Generally, a particular update in a database system is associated with a change of data in the database system, but not necessarily to a change that is visible outside of the boundaries of a transaction (such as a series of updates) containing the particular update. In some embodiments, updates to the respective database system of a first one of the nodes, such as the active node, are applied, and are written through to others of the nodes as they are applied, irrespective of whether the updates are committed. Transaction commits are similarly written through (as another form of update). A node receiving the written-through updates, such as a standby node, is able to apply the written-through updates to the respective database of the receiving node as the written-through updates arrive. But as with the general case described above, the written-through updates are not visible outside the boundaries of a containing transaction until the written-through containing transaction commit is received and applied. In other embodiments, updates to the respective database system of a first one of the nodes, such as the active node, are applied and are written through to others of the nodes on transaction commit boundaries, so that intermediate (uncommitted) updates are not written through. In further embodiments, updates to the respective database system of a first one of the nodes, such as the active node, are applied and are written through to others of the nodes in groups of committed transactions. According to various embodiments, a group of committed transactions is one or more of: a sequence of transactions that were sequentially committed; and a snapshot of changes caused by a sequence of committed transactions that were sequentially committed. A sequence of transactions that were sequentially committed optionally includes multiple, sequential updates of a single record, whereas a snapshot of changes caused by a sequence of transactions includes a single update for each record that was changed, the single update providing the final state of the record. Updates, as referred to herein, generally refer to updates due to committed transactions, as an update within a transaction that is not yet committed is generally only visible within that transaction.

While techniques described herein generally refer to a single active node and a single standby node, the techniques are extendible to systems having a plurality of active nodes and/or a plurality of standby nodes. In a first example, a first one of the nodes serves as a respective active node for a first cache group, and a second one of the nodes serves as a respective active node for a second cache group. In a second example, a system has one active node and two standby nodes. Similarly, there is no restriction to having a single backend database system. For example, a first cache group is associated with a first backend database system, and a second cache group is associated with a second backend database system.

Active Writethrough Overview

In some embodiments, updates, such as updates from one or more client systems (such as clients 171 of FIG. 1), are applied to the active node and are written through (propagated) by the active node to the standby node. The standby node writes the updates through to a backend database system. The active node and/or the standby node write through the updates to the replica nodes (if any). In various embodiments, the load on the active node is reduced by having the standby node write through all or a majority of the updates to the replica nodes. In some embodiments and/or usage scenarios, updates applied to a particular one of the nodes, such as to the active node, are non-durable in that a failure of the particular node possibly results in a loss of a small number of the updates.

In an example of recovery from a failure of the active node, the standby node becomes (takes over the role of) the active node, and the client updates are subsequently applied to the (new) active node. The (new) active node also takes over the writing through of the updates to any of the replica nodes that were being performed by the failed active node (as well as continuing to write through the updates to the backend database system). The failed active node is recovered, synchronized with the (new) active node, and becomes the standby node. The (new) standby node then takes over writing through the updates to the backend database system, and optionally and/or selectively takes over writing through the updates to replica nodes (if any, and as required by load balancing and other considerations).

In an example of recovery from a failure of the standby node, the active node takes over writing through the updates to the backend database system, and to any of the replica nodes that were being performed by the failed standby node. The failed standby node is recovered, synchronized with the active node, and resumes operation as the standby node (including taking over writing through the updates to the backend database system, and writing through updates to ones of the replica nodes as required).

When either the active node or the standby node fails, ones of the updates that occur between the failure and subsequent recovery are not applied (either directly, or via writethrough) to the failed node. By assigning an associated commit ticket number to each of the updates, by storing the commit ticket numbers (with other update-related information) in a transaction log, and by sending the commit ticket numbers along with the updates (such as from the active node to the standby node), the system is able to determine how far behind a failed node is compared to the surviving node, and the failed node is synchronizable with the surviving node without having to copy the entire state of the surviving node.

Because of the flow of writethrough updates from the active node to the standby node, and from the standby node to the backend database system, the standby node contains a subset (including a proper subset) of the ones of the updates that have been seen and processed by the active node, and the backend database system contains a subset (including a proper subset) of the ones of the updates that have been seen and processed by the standby node. Further, a failure of the standby node does not lose any of the updates, and the active node is enabled to use the commit ticket numbers stored in the backend database system to ensure that the backend database system has all of the updates. Similarly, a failure of the active node optionally and/or selectively loses a small number of updates that were in progress when the active node failed, but the standby node and the backend database system remain consistent. (In some embodiments, no updates are lost in the event of a failure of the active node if all of the updates were transactional and durable, as the updates are either committed and thus persistent, or not yet committed and thus not guaranteed to an application to be complete.)

Autorefresh Overview

In some embodiments, updates, such as updates of the backend database system, are autorefreshed to the active node, and are then written through by the active node to the standby node (and from the active node and/or the standby node to the replica nodes, if any). In an example of recovery from a failure of the active node, the standby node becomes the active node, and the autorefresh updates are applied to the (new) active node. The failed active node is recovered, synchronized with the (new) active node, and becomes the standby node. In an example of recovery from a failure of the standby node, the failed standby node is recovered, synchronized with the active node, and resumes operation as the standby node.

When either the active node or the standby node fails, ones of the updates that occur between the failure and subsequent recovery are not applied (either by autorefresh, or via writethrough) to the failed node. By maintaining a change log of updated rows of the backend database, and by maintaining bookmarks in the change log and other tables to indicate which updates have been applied to each of the active node and the standby node, the system is able to determine how far behind the failed node is compared to the updates of the backend database system, and the failed node is synchronizable with the backend database system without having to fully replace contents of the respective database of the failed node.

Backend Database System Overview

In some embodiments, the backend database system is different from the respective database systems of the nodes, such as by being a disk-based relational database system (whereas the respective database systems of the nodes are in-memory database systems). In other embodiments, the backend database system is identical to the respective database system of at least one of the nodes. In some embodiments, the backend database system is treated differently than the respective database systems of the nodes, while in other embodiments the backend database system is treated similarly to the respective database systems of the nodes. In some embodiments, the backend database system is the respective database system of a particular one of the nodes. For example, updates applied directly to the backend database system are, in some embodiments, propagated by active writethrough from the backend database system acting as an active node with respect to the updates applied directly to the backend database system.

While in some of the embodiments herein, certain techniques such as active writethrough are described, in part, with respect to ones of the nodes, and other techniques such as autorefresh are described, in part, with respect to the backend database system, in other embodiments, any of the techniques are applicable to either the nodes or to the backend database system, and in any combination. Accordingly, in some embodiments, one of the nodes includes, in whole or in part, the backend database system, and references to nodes herein are considered to include, in some embodiments, the backend database system.

Recovery from Node Failure Overview

In some embodiments, a master update list (MUL) maintains a list of updates (committed transactions) applied at a master node, and the MUL is used, at least in part, to track which of the updates have been propagated, such as by being written through, to others of the nodes. According to various embodiments, the master node is one or more of: the active node; and the backend database system. In a first example, an MUL is a transaction log at an active node (such as a transaction log 300 as illustrated in FIG. 3A). In a second example, an MUL is a change log table in a backend database system (such as change log table 444 as illustrated in FIG. 4B). Of course, in other examples, an active node is configured to use a change log table as an MUL, or a backend database system is configured to use a transaction log as an MUL.

In further embodiments, the master node maintains a record of which of the updates have been acknowledged by the others of the nodes. A particular one of the nodes acknowledges a particular one of the updates when the particular node has committed the particular update so that it is persistent (non-volatile), such as by writing the update (or a log thereof) to non-volatile storage. To keep the MUL from growing without bound, the MUL is, in some embodiments, garbage collected by removing ones of the updates that have been acknowledged by all of the others of the nodes.

In some embodiments, the roles of master node, active node, and standby node are not fixed to specific ones of the nodes, but are associated with particular portions of data, such as cache groups (or tables). For example, at the active node, a first cache group is updated using autorefresh from the backend database system (which thus acts as the master node for the first cache group), and a second cache group is updated by client updates (and thus the active node is the master node for the second cache group).

In some embodiments, an MUL includes a plurality of entries, each of the entries includes an update identifier associated with a respective one of the updates, and each of the entries is or is able to be associated with an MUL locator. In some embodiments, an MUL locator is an index (or a pointer) to one of the entries in the MUL. In other embodiments, an MUL locator is an identifier (such as a sequence number) stored in a particular one of the entries of the MUL, and the particular entry is found by searching for the MUL locator, such as by a linear search, a binary search, a hash-based search, a B-tree search, or any other technique of finding a value located in one of a plurality of entries. In a first example of the entries of the MUL, each entry in the MUL is a commit record in a transaction log (such as commit record 314 in transaction log 300 as illustrated in FIG. 3A), and an MUL locator is a commit ticket number (such as CTN.X 323 as illustrated in FIG. 3B) stored in each entry. In a second example of the entries of the MUL, each entry in the MUL is a row in a table (such as entry 440 of change log table 444 as illustrated in FIG. 4B), and an MUL locator is a bookmark (such as bookmark 440.B as illustrated in FIG. 4B) stored in each entry.

According to various embodiments, the update identifier in each of the MUL entries includes one or more of: a log number; a key; and any other identifier used to identify and/or locate at least one of the updates. In some embodiments, a log number is a unique identifier, such as a pointer, used to locate information corresponding to a transaction log entry for the associated update. The corresponding information includes, in various embodiments, information sufficient to replay (or to redo) the update. Given a particular one of the MUL entries, the log number in the particular entry enables the update associated with the particular entry to be replayed.

In some embodiments, a key used as a unique identifier in an MUL entry associated with a particular one of the updates is a copy of a key (such as a primary key) of a table modified by the update. Given a particular one of the MUL entries associated with a particular one of the updates, the key in the particular entry enables a latest version of data that was modified by the particular update to be retrieved. In further embodiments and/or usage scenarios, two or more of the MUL entries have a same key due to sequential updates to a same row of a table (or rows of multiple tables in a cache group, the rows having the same key).

In some embodiments, an MUL locator is used to identify one or a group of the updates stored in the MUL. In further embodiments, when a particular update is written through to a particular one of the nodes, the particular update includes a respective MUL locator (or, alternatively, the respective MUL locator is sent in conjunction and/or associated with the particular update). The particular node receives the written-through update, applies the written-through update to its respective database, and, in some embodiments, communicates a commit of the written-through update by sending an acknowledgment with the respective MUL locator back to the master node. In further embodiments, the master node maintains a record of the last MUL locator acknowledged by each of the other nodes.

In some embodiments, an update is written through a succession of nodes. In a first example, an update applied to a backend database system is written through, such as an autorefresh update, to an active node, which in turn propagates the update as an active writethrough update to a standby node. In a second example, an update applied to an active node is written through, such as by an active writethrough update, to a standby node, which in turn propagates the update as a standby writethrough update to a backend database system. In a third example, a system has an active node and a plurality of standby nodes, and an update applied to an active node is written through to a first one of the standby nodes, which in turn propagates the update to a second one of the standby nodes. In a fourth example, updates written through to a standby node are in propagate through to one or more replica nodes.

In some embodiments, at least some of the nodes, such as the standby node, applying written-through updates maintain in a respective local update list (LUL) a list of the written-through updates applied at the node. Similar to a MUL, a LUL includes a plurality of entries, each of the entries includes an update identifier associated with a respective one of the updates, and each of the entries is or is able to be associated with an LUL locator. Similar to the MUL, locator, an LUL locator is used to identify entries in the LUL. In one example, an LUL is a transaction log at a standby node (such as a transaction log 300 as illustrated in FIG. 3A), and an LUL locator is a commit ticket, number (such as CTN.Y 335 as illustrated in FIG. 3C) stored in each entry. In various embodiments, the LUL of the standby node is enabled to become the MUL when the standby node takes over for a failed active (and, in this case, master) node.

In some embodiments, at least some of the nodes receiving a written-through update store the respective MUL locator of the written-through update in the respective LUL. For example, as illustrated in FIG. 3C, commit record 314.Y stores an MUL locator CTN.X 333, and an LUL locator CTN.Y 335. In further embodiments, when a particular one of the nodes receiving a written-through update (including a respective MUL locator) propagates the written-through update, the propagated written-through update includes the respective MUL locator and a respective LUL locator (or, alternatively, the respective MUL locator and the respective LUL locator are sent in conjunction and/or associated with the propagated written-through update). In still further embodiments, a subsequent one of the nodes, such as a replica node, receiving the propagated written-through update applies the propagated written-through update to its respective database, and communicates a commit of the propagated written-through update by sending an acknowledgment with the respective MUL locator back to the master node, and by sending an acknowledgment with the respective LUL locator back to the particular node. In some embodiments, by sending acknowledgments back to both the master node and to the particular node, the particular node is able to take over for the master node in the event that the master node fails.

In some embodiments, the MUL enables more rapid recovery from failure of a node. In a first example, if a particular one of the nodes (such as any one of the standby node, or one of the replica nodes, or in various embodiments and/or usage scenarios the active node) fails, when the particular node comes back up, a particular MUL locator is retrieved for the last update acknowledged by the particular node. According to various embodiments, the particular MUL locator is retrieved from a last committed entry in a transaction log of the particular node, or the particular MUL locator is retrieved from an acknowledgement list maintained on the master node. By using the particular MUL locator, the master node (or, in some embodiments, another node acting for the master node) is able to identify all updates in the MUL subsequent to the update associated with the particular MUL locator, and to send those updates to the particular node to synchronize the particular node. In some embodiments, if the master node is the backend database system, another one of the nodes, such as the active node or the standby node or the particular node itself, is enabled to identify all updates in the MUL subsequent to the update associated with the particular MUL locator, and to send those updates to the particular node.

Continuing the first example, if the particular node is the active node, the active node is recovered and remains the active node. (In various embodiments and/or usage scenarios, the roles of the active node and the standby node optionally and/or selectively do not switch on a failure of the active node.) Recovering the active node without changing the role of the active node is, in some embodiments and/or usage scenarios, less disruptive, such as when the failure is of a type that is quickly recoverable (for example, as failure of a process on the active node). In various embodiments, while the active node is being recovered, updates to the active node are suspended, such as by being queued or by being dropped. In one example, client updates to the active node while the active node is being recovered are queued at the client(s) and/or within the active node and are not lost. In another example, autorefresh updates to the active node while the active node is being recovered are not transmitted to the active node until after the active node is recovered, and no autorefresh updates are lost.

In a second example, if the active nodes fails, when the active node comes back up, the standby node is now the new active node, and the active node is now the new standby node. The LUL maintained on the standby node is now the MUL. Recovery of the new standby node is then similar to that of the first example. In some embodiments, recovery of the new standby node is with respect to two separate master nodes, and the techniques of the first example are applied twice. For example, the backend database system is the master node for autorefresh updates to the active node, and the active node was the master node for client updates applied to the active node (a role now assumed by the standby node).

In various embodiments, a system using techniques such as described above to manage and/or to recover from failures is resilient to various types of failures, such as: failure of the active node; failure of the standby node; failure of one of the replica nodes; failure of a network connection of any of the preceding; temporary failure of the backend database system or of a network connections to the backend database system; and other types of failures. In a first example, if the backend database system fails, client updates sent to the active node continue to be applied to the respective database of the active node. When the backend database system is recovered, the client updates are written through to the backend database system. In a second example, if a network connection from the backend database system to the active node is broken, clients continue to query the replica nodes (and optionally and/or selectively the active node and/or the standby node). When the network connection is restored, autorefresh updates from the backend database system to the active node resume.

DETAILED DESCRIPTION

FIG. 1A illustrates selected details of an embodiment of a system with active and standby nodes highlighting writethrough connections. FIG. 1A (and other similar figures herein) illustrate a number of components, including node X 121, node Y 123, a number of replica nodes R1 131, R2 132, R3 133, and R4 134, clients 171, backend database 110, and cluster manager 181. In some embodiments, some or all of these components are co-located at a single site (a physical location), such as site 100. For example, database 110 is illustrated as being outside of site 100. In other embodiments, database 110 is located within site 100. Similarly, clients 171 are illustrated as being located within site 100. In other embodiments, some or all of clients 171 are located outside of site 100. There are no logical restrictions based on locality of the components, though locality optionally affects performance factors (such as efficiency, throughput, or latency) and physical factors (such as a type of network connection among components).

According to various embodiments, any or all of the components include processing devices, such as one or more of: processors; multiprocessors: microprocessors; workstations; personal computers; server computers; mainframe computers; server blades; any other computer, computing device, or computer system; and any combination thereof. In a first example, in some embodiments, node X 121 and node Y 123 are each server blades in a blade server. In a second example, node X 121 is a multiprocessor computer system, and database 110 is a sever computer system. In some embodiments, some or all of the functionality of any or all of the components is provided by software, firmware, microcode, or other executable and/or interpretable code executing independent or cooperatively on the components.

FIG. 1A illustrates various network or other communication connections, such as active writethrough updates 125, standby writethrough updates 127, updates 175, management connections 185, and connections 129, 141, 142, 143, 144, and 149. There are no restrictions as to the type, format, or protocol of or used by any of these network or other communication connections (or for that matter, all other similar connections elsewhere herein). For example, any or all of these network or other communication connections (as well as all other similar connections elsewhere herein) are performed on one or more direct communication links (such as a computer bus, a PCI bus, an InfiniBand® connection, or other communications links) and/or on network links (such as Ethernet, Packet Over Sonet (POS), Wide-Area Network (WAN), Local-Area Network (LAN), or other network links). Continuing the example, any or all of these network or other communication connections (as well as all other similar connections elsewhere herein) are performed using one or more protocols, such as a message passing protocol, a remote procedure call protocol, a layer 2 or higher layer communication protocol, ATM protocol, TCP/IP, and UDP.

Some of the connections in FIG. 1A (and in other figures herein) are illustrated (in some figures) as dashed lines, such as connections 129 and 149, and others are illustrated as solid lines, such as updates 175 and connections 141, 142, 143, and 144. Some of the connections, such as connections 149, are illustrated as dashed lines in one figure (such as FIG. 1A) and as solid lines in another figure (such as FIG. 1B). In some embodiments, the connections illustrated as dashed lines are not present and/or are present primarily as a backup until an event, such as a failure of a node, occurs. For example, on a failure of node Y 123, primary connections 141, 142, 143, and 144 are unavailable and are replaced by backup connections 149 from node X 121.

Some of the connections in FIG. 1A (and in other figures herein) are illustrated as unidirectional arrows, while other connections use bidirectional arrows. Unidirectional arrows are generally used herein to indicate a direction of flow most relevant to the embodiment being described, and do not imply that any of the connections are solely unidirectional. For example, active writethrough updates 125 is illustrated with a unidirectional arrow to indicate a flow for update information, but, in some embodiments, node Y 123 provides acknowledgments of the active writethrough updates to node X 121 via the same connection 125.

FIG. 1A illustrates four replica nodes (R1 131, R2 132, R3 133, and R4 134. Other embodiments have any number of replica nodes, including zero replica nodes. Three of the replica nodes (R1 131, R2 132, and R3 133) are illustrated as being part of site 100 along with node X 121 and node Y 123, while replica node R4 134 is illustrated as being outside of site 100. In other embodiments, any of the nodes, including the active node, the standby node, and the replica node, is optionally and/or selectively co-located in any grouping in one or more sites. For example, in some embodiments, the active node and the standby node are located at different sites.

The replica nodes are coupled to node Y 123 by connections 141, 142, 143, and 144. In one example, connections 141, 142, 143 from node Y 123 to replica nodes R1 131, R2 132, and R3 133 are LAN connections within site 100, and connection 144 from node Y 123 to replica node R4 134 is an external WAN connection of site 100. The replica nodes are also illustrated as being coupled to node X 121 by connections 149. In some embodiments, some or all of connections 149 are used to propagate data (such as updates) to one or more of the replica nodes (and corresponding ones of connections 141, 142, 143, and 144 are not used). For example, depending on factors such as system speed, performance, workload, and load-balancing configurations, some or all of the primary connections to the replica nodes are provided by node Y 123, and the remainder of the primary connections (if any) are provided by node X 121. In some embodiments, the one of node X 121 and node Y 123 that is the standby node provides all or a majority of the primary connections to the replica nodes.

In various embodiments, cluster manager 181 is coupled to any or all of the components by management connections 185, including, in some embodiments, components outside of site 100. According to various embodiments, cluster manager 181 performs functions such as control for system initialization and/or recovery, system health and/or performance monitoring, and other similar functions. For example, cluster manager 181 is enabled to detect a failure of node X 121 (such as by loss of a heartbeat from node X 121), and to initiate system recovery procedures (such as by controlling conversion of a role of node Y 123 to active. In some embodiments, cluster manager 181 monitors the status of a health monitor running on each of the nodes. In the event that cluster manager 181 detects a failure of a particular one of the nodes, a respective set of rules for the failure of the particular node is used by cluster manager 181 to determine and control recovery from the failure.

Clients 171 source updates 175 to node X 121. In some embodiments, updates 175 include part or all of a transaction, such as an SQL data manipulation statement optionally in a parsed and/or processed form. While updates 175 optionally contain SQL queries that solely read data without modifications, such read-only accesses are not subject to writethrough. Clients 171 and/or other clients not illustrated in FIG. 1A also source read-only requests to one or more of the nodes (including the replica nodes). In some embodiments, the replica nodes provide greater capacity and/or improved locality to manage the read-only requests. In some embodiments, a load balancer (not illustrated in FIG. 1A) distributes the read-only requests among the nodes.

In an example of normal operation (when both node X 121 and node Y 123 are operating), one of node X 121 and node Y 123 is an active node and the other is a standby node. As illustrated in FIG. 1A, node X 121 is the active node and node Y 123 is the standby node. Definition of which of node X 121 and node Y 123 is the active node or the standby node varies for multiple reasons. In a first example, in some embodiments, after a failure of the active node, the roles of the active node and the standby node switch. In a second example, in some embodiments, node X 121 is the active node with respect to a first set of one or more cache groups, and node Y 123 or one of the replica nodes is the active node with respect to a second set of one or more cache groups.

Updates 175 from clients 171 go to the active node (node X 121 as illustrated in FIG. 1A). Updates 175 are used by the active node to update the respective database of the active node, and the updates are written through (propagated) to the standby node (node Y 123 as illustrated in FIG. 1A) as active writethrough updates 125. In some embodiments, active writethrough updates 125 include other updates received by the active node, such as autorefresh updates from database 110. The active node optionally and/or selectively writes through updates 175 (and, in some embodiments, other updates, the active node receives) to one or more of the replica nodes (R1 131, R2 132, R3 133, and R4 134).

Continuing the example of normal operation, the standby node (node Y 123 as illustrated in FIG. 1A) receives active writethrough updates 125. Active writethrough updates 125 are used by the standby node to update a respective database of the standby node, and the updates (or, in some embodiments, ones of the updates corresponding to updates 175) are written through to database 110 as standby writethrough updates 127. The standby node optionally and/or selectively writes through active writethrough updates 125 to one or more of the replica nodes (R1 131, R2 132, R3 133, and R4 134). In some embodiments, the standby node writes through active writethrough updates 125 to all of the replica nodes. In other embodiments, the standby node writes through active writethrough updates 125 to any of the replica nodes to which the active node does not write through client updates 175.

By writing through updates 175 from the active node to the standby node, from the standby node to database 110, and from one or both of the active node and the standby node to the replica nodes, all of the nodes and database 110 are kept synchronized (receiving copies of all of updates 175). On failure of a node, however, additional information (such as the replication peers table illustrated in FIG. 3D) is required, in some embodiments, to maintain and/or to restore synchronization.

Figure 2:
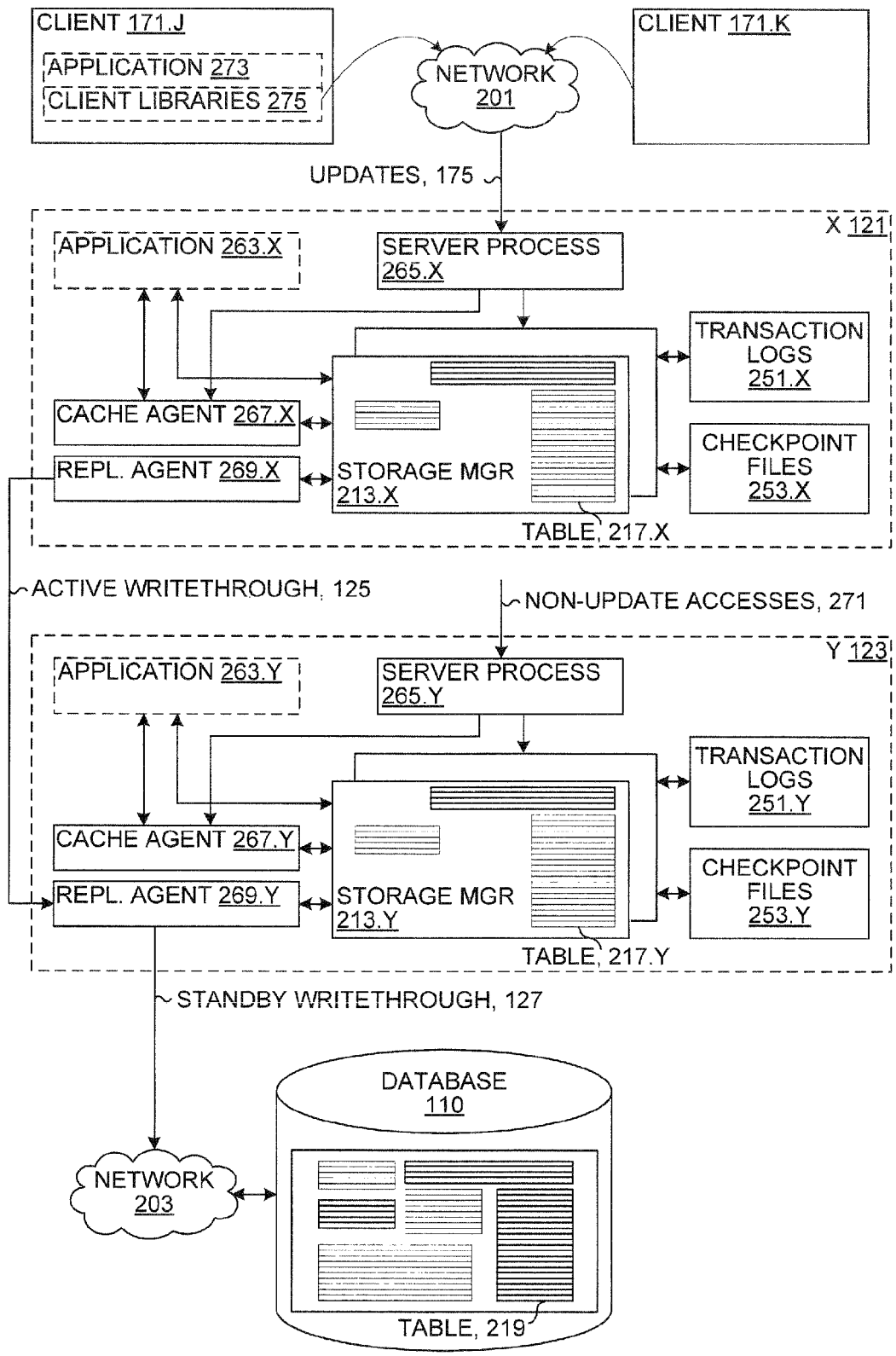
FIG. 2 illustrates selected details of the system of FIG. 1A highlighting components of the active node and of the standby node.

FIG. 2 illustrates selected details of the system of FIG. 1A highlighting components of the active node and of the standby node.

As illustrated in FIG. 2, node X 121 and node Y 123 have similar sub-components and structures. Details of the sub-components and structures are provided for purposes of example, and are not limiting. In other embodiments, node X 121 and node Y 123 have different sub-components and/or structures, and support the same or similar connections.

The replica nodes (R1 131, R2 132, R3 133, and R4 134 as illustrated in FIG. 1A) are not illustrated in FIG. 2, but have, in some embodiments, a structure similar to that of node X 121 or node Y 123.

Database 110 includes a respective database and stores tables, such as one or more tables 219. The structure and/or sub-components of database 110 are, in some embodiments, similar to those of node X 121 or node Y 123. In other embodiments, database 110 includes a different type of respective database than the respective databases of node X 121 or node Y 123, for example a disk-based relational database management system, and the structure and/or sub-components of database 110 is accordingly different from that of node X 121 or node Y 123. Database 110 is implementable in a variety of ways within the scope of the teachings herein.

Database 110 is accessible (from various other components, such as from node Y 123) via one or more connections, as illustrated by standby writethrough updates 127 communicated via network 203. According to various embodiments, network 203 is any type of network, such as a LAN or a WAN, or any combination of types of networks, such as the Internet.

Clients 171.J and 171.K (representative of clients 171 as illustrated in FIG. 1A) provide, via network 201, updates 175 to the active node (node X 121 as illustrated in FIG. 2). According to various embodiments, network 201 is any type of network, such as a LAN or a WAN, or any combination of types of networks, such as the Internet. Additional details are illustrated for client 171.J to illustrate an example of client operation. Client 171.J includes application 273 and client libraries 275. Application 273 represents an application program, such as a database application, that communicates via client libraries 275 with server process 265.X in node X 121 to perform updates to database 110 (via writethrough to node Y 123 and to database 110). In some embodiments, performing updates via node X 121 provides higher performance than performing the updates directly on database 110, such as when node X 121 includes, at least in part, a cache of some of the contents of database 110, and/or when node X 121 includes an in-memory database.

In various embodiments, node Y 123 receives accesses, such as read-only queries, via non-update accesses 271. In some embodiments, non-update accesses 271 are sourced, at least in part, by clients 171 via network 201. In other embodiments, non-update accesses 271 are sourced, at least in part, by clients other than clients 171, and are provided, at least in part, by a same or a different network from network 201. In some embodiments and/or usage scenarios, non-update accesses 271 include updates to data in cache groups for which node Y 123 is the active node.

Each of node X 121, node Y 123, and database 110 includes one or more respective tables (table 217.X, table 217.Y, and table 219). The tables represent contents of the respective database, and, in some embodiments, are used for data accessed by clients 171.J and 171.K as well as being used by agents within the nodes (such as replication agent 269.X). In some embodiments, on each of at least some of the respective databases, one or more of the tables are configured as a cache group. In various embodiments, table 217.X (and/or table 217.Y) is a subset of the rows and/or columns of table 219.

The respective databases of node X 121 and node Y 123 are accessed by a respective storage manager (storage manager 213.X and storage manager 213.Y). In some embodiments, one or more of the respective databases is an in-memory database.

In some embodiments, node X 121 (and/or node Y 123) includes transactions logs 251.X (transactions logs 251.Y) and/or checkpoint files 253.X (checkpoint files 253.Y) coupled to storage manager 213.X (storage manager 213.Y). In further embodiments, using transaction logs and/or checkpoint files enables data stored in the respective database of node X 121 (and/or node Y 123) to be persistent despite failures. According to various embodiments, transaction logs 251.X (or transactions logs 251.Y) are used for one or more of: recovering a transaction if either an application (such as one of application 273 and application 263.X) sourcing the transaction or storage manager 213.X (or storage manager 213.Y) fails; undoing (rolling back) transactions; replicating changes to other databases; and enabling the applications to detect changes to database contents. In some embodiments, checkpoint files 253.X (or checkpoint files 253.Y) store a snapshot of the respective database of the active node (or the standby node), and are used to restore the respective database to a last transactionally consistent state.

Node X 121 (and/or node Y 123) includes one or more agents to control and/or to manage operations of node X 121 (of node Y 123), such as cache agent 267.X (cache agent 267.Y) and replication agent 269.X (replication agent 269.Y). In various embodiments, cache agent 267.X (cache agent 267.Y) controls a way in which data is stored by storage manager 213.X (storage manager 213.Y). For example, in some embodiments, cache agent 267.X controls a subset of the contents of database 110 that is resident in tables accessed by storage manager 213.X.

In some embodiments, replication agent 269.X and replication agent 269.Y operate cooperatively to control a way in which data is replicated among nodes. In further embodiments, the replica nodes (R1 131, R2 132, R3 133, and R4 134 as illustrated in FIG. 1A) also include a replication agent to communicate with one or more of replication agent 269.X and replication agent 269.Y. Replication agent 269.X and replication agent 269.Y communicate via active writethrough 125 to maintain synchronization of the respective databases of node X 121 and node Y 123.

Optional application 263.X and optional application 263.Y represent applications running on the active node and the standby node, respectively, similar to application 273 running on a separate client 171.J. In some embodiments, application 263.X and/or application 263.Y source updates, similar to updates 175. In various embodiments, application 263.Y is not present, and/or is restricted to have read-only access to cache groups for which node X 121 is the active node (as updates are applied via the active node). In some embodiments, application 263.X has a direct connection to the respective database of node X 121 (such as to storage manager 213.X). In various embodiments, the direct connection couples application 263.X and storage manager 213.X via a heap of application 263.X, or via a shared memory segment.

In some embodiments, one or more of the components of node X 121 and node Y 123 and database 110 are coupled in additional ways (not illustrated in FIG. 2). For example, in various embodiments, cache agent 267.X (and/or cache agent 267.Y) are coupled to database 110 to provide bulk loading of data from database 110 via storage manager 213.X (and/or storage manager 213.Y). In various embodiments, application 263.X (and/or application 263.Y) requests the loading of data from database 110, such as the initial loading of one or more cache groups.

FIG. 3A illustrates selected details of an embodiment of a transaction log. In some embodiments, transaction log 300 illustrates a transaction log of a database, such as all or a portion of transaction logs 251.X or transaction logs 251.Y of FIG. 2. In various embodiments, there are multiple transaction logs, for example one transaction log for each table, or one transaction log for each group of related tables (such as a cache group).

Transaction log 300 includes a number of types of records, such as begin record 310 (indicating a start of the transaction log), update records 312 and 316 (indicating updates to tables), and commit records 314 and 318 (indicating transaction commits of certain ones of preceding update records). In some embodiments, transactions logs include other types of records. Of course, the number and arrangement of the records is a function of the usage of the database, and FIG. 3A is one example illustrating some of the types of records.

In some embodiment and/or usage scenarios, transaction log 300 is purged of records that are no longer necessary (for example, by garbage collection), such as when it is known that the transactions represented by the records have been committed to a backend database system. In further embodiments, at least some of the records in transaction log 300, such as the commit records, are no longer necessary when written-through updates corresponding to the commit records have been acknowledged by all of the ones of the nodes that are configured to receive the written-through updates. According to various embodiments, commit records in transaction log 300 that are no longer necessary are removed from transaction log 300 by one or more of: a replication agent (such as replication agent 269.X as illustrated in FIG. 2); a storage manager (such as storage manager 213.X as illustrated in FIG. 2); and any combination of the foregoing.

In some embodiments, a node has a single transaction log for all transactions performed by the respective database of the node. In other embodiments, a node has a plurality of transaction logs, such as one transaction log for each cache group.

In some embodiments, transaction log 300 is or includes a master update list (MUL) and/or a local update list (LUL). In further embodiments, a subset of transaction log 300 composed of at least some of the commit records is an MUL (or an LUL).

FIGS. 3B and 3C illustrate selected details of embodiments of respective commit records on an active node and on a standby node. In some embodiments, commit record 314.X (commit record 314.Y) is one of the commit records in a transaction log, such as transaction log 300 of FIG. 3A. In some embodiments, a master update list on the active node (and a local update list on the standby node) is or includes a plurality of commit records.

Commit record 314.X includes log number 327 (indicating a position and/or a unique identifier in a transaction log), commit ticket number for node X (CTN.X) 323, and zero or more other fields (not illustrated in FIG. 3B). Commit record 314.Y includes log number 337 (indicating a position and/or a unique identifier in a transaction log), commit ticket number for node X (CTN.X) 333, commit ticket number for node Y (CTN.Y) 335, and zero or more other fields (not illustrated in FIG. 3C). In some embodiments, a format of commit record 314.X and commit record 314.Y is identical, and commit record 314.X leaves a CTN.Y field empty.

In some embodiments, a commit ticket number (CTN) is a monotonically increasing number (such as a sequence number). In other embodiments, a CTN includes a high-order portion and a low-order portion: the high-order portion is a timestamp indicating, for example, when the node assigning the CTN started a respective database: and the low-order portion is a monotonically increasing number (such as a sequence number). By including the timestamp as a high-order portion, in some embodiments, recovery from a failure is simplified because the monotonically increasing numbers in the low-order portion are initialized to zero (or another fixed, starting point), and the timestamp ensures that CTNs as a whole are monotonically increasing (including before and after the failure).

In some embodiments, when a transaction is committed on a node (such as node X 121 or node Y 123 of FIG. 2), a CTN is assigned for the transaction. For example, in some embodiments, the CTN is assigned by a storage manager, such as storage manager 213.X as illustrated in FIG. 2, when the transaction is committed. The CTN is stored in a commit record corresponding to the transaction in a transaction log (such as transaction log 300 as illustrated in FIG. 3A). In various embodiments, the CTN is an MUL locator (or an LUL locator), where at least some of the commit records of the transaction log correspond to a master update list (or a local update list).

In some embodiments, CTNs are propagated as part of and/or in conjunction with writethrough updates, such as active writethrough updates. In further embodiments, updates (and the corresponding CTNs) propagate through one or more nodes before being written through to a backend database system. In various embodiments, all writethrough updates are performed in a same sequence on all of the nodes and on the backend database system.

In more detail, a node receiving a writethrough update and a corresponding CTN (or a list of corresponding CTNs if there were multiple preceding nodes all performing writethroughs), performs the writethrough update, assigns a CTN of its own for the writethrough update, and stores both the received CTN(s) and the assigned CTN in a commit record for the writethrough update. The last one in a sequence of nodes receiving the writethrough update propagates the writethrough update as a standby writethrough update to a backend database system. Further, both the received CTN(s) and the assigned CTN of the last node are stored in a table in the backend database system, the table having a row for each of the nodes assigning CTNs. Accordingly, each node and the backend database system in the flow of writethrough updates maintains knowledge of a sequence of the updates seen, and is able to use the CTNs to determine where any given update is in the sequence of updates, and on any of the other nodes.

For example, when a transaction is committed on an active node (such as node X 121 of FIG. 2), the (active node) CTN assigned for the transaction is sent as part of and/or in conjunction with update information for the transaction as part of an active writethrough update (such as via active writethrough updates 125 of FIG. 2). The active node CTN is also stored in a corresponding commit record in a transaction log on the active node. A standby node (such as node Y 123 of FIG. 2), receives the update information and performs a corresponding transaction commit. The standby node also assigns a (standby node) CTN for the transaction. When the transaction is committed on the standby node, both the active node CTN and the standby node CTN are stored in the commit record in a transaction log on the standby node. Continuing the example, the standby node also stores the active node CTN and the standby node CTN, along with corresponding identifiers for the active node and the standby node, in a replication peers table in a backend database (such as database 110 of FIG. 2). FIG. 3D illustrates an example of a replication peers table (replication peers table 344). Thus, in some embodiments, the CTN information for each node in the path is propagated as part of and/or in conjunction with writethrough update information.

In some embodiments, maintaining separate CTN assignments on the active node and the standby node simplifies recovery. In other embodiments, a single, global CTN assignment is performed, such as on the active node.

In some embodiments, writethrough updates received at one of the nodes are acknowledged by sending an acknowledgment to the active node and/or to the standby node containing the CTNs assigned by the node to which the acknowledgement is sent. For example, in some embodiments, one of the replica nodes receiving a propagated update from the standby node and including a corresponding active node CTN and a corresponding standby node CTN, sends an acknowledgement of the update to the active node with the active node CTN, and sends an acknowledgement of the update to the standby node with the standby node CTN.

In some embodiments, the backend database system is configured to send acknowledgments of updates to the active and/or standby nodes with the corresponding CTNs. In other embodiments, the standby node is configured to send acknowledgments for the backend database system to the active node, based on responses, such as indications of commits, received from the backend database system. In still other embodiments, instead of acknowledgements from or for the backend database system, the CTNs that would have been acknowledged are stored in a table in the backend database system, such as a replication peers table (as illustrated in FIG. 3D). Since multiple tables are able to be updated as part of a single transaction (such as an atomic transaction), the replication peers table is able to provide a consistent and accurate record of the latest update (as identified by the CTNs) received and applied by the backend database system.

In some embodiments, acknowledging the updates using the corresponding CTNs enables a node receiving the acknowledgements to prune its transaction log, since any entry that has been acknowledged by all others of the nodes configured to receive the updates is no longer needed for recovery of the others of the nodes. In further embodiments, acknowledgements of updates for the backend database system are obtained by accessing, such as by querying, a replication peers table stored in the backend database system. The replication peers table contains, for each of the active node and the standby node, a node identifier and the respective CTNs from the active node and the standby node corresponding to a last one of the updates committed by the backend database system.

Continuing the example, each of the active node and the standby node records the "last acknowledged" CTN for each of the replica nodes. If a particular one of the replica nodes fails and is recovered, either the active node or the standby node is able to determine from the respective last acknowledged CTN of the particular replica node, which ones of the updates the particular replica node has not received, and the state of the particular replica node is able to be synchronized by sending the updates between an update corresponding to the respective last acknowledged CTN of the particular replica node and a latest one of the updates. In some embodiments, failures of the standby node use a similar recovery mechanism. In various embodiments, the synchronization replays a sequence of transactions indicated in the transaction log (of, for example, the active node) between the update corresponding to the respective last acknowledged CTN of the particular replica node and the latest update. For example, a commit record in the transaction log corresponding to the respective last acknowledged CTN of the particular replica node is located in the transaction log, and the associated log number of the commit record is used to find and replay the transactions. In other embodiments, a snapshot of a portion of contents of the respective database (from, for example, the active node) corresponding to a portions of the respective database modified by the sequence of transactions is sent to the particular replica node to synchronize the particular replica node.

According to various embodiments, a replication agent on a particular one of the nodes is enabled to perform one or more of: receiving an update from a preceding one of the nodes; executing the update, such as via a storage manager; receiving confirmation, such as from a storage manager, that the update is committed; receiving a CTN for the committed update, such as from a storage manager; sending an acknowledgement of the committed update to the preceding node; and writing through the update to a subsequent one of the nodes. According to various embodiments, the acknowledgment includes one or more of: a CTN received from the preceding node as part of (or along with) the update; and the CTN assigned by the particular node. According to various embodiments, the written through update includes one or more of: the CTN received from the preceding node; and the CTN assigned by the particular node.

FIG. 3D illustrates selected details of an embodiment of database tables used with active writethrough. Replication peers table 344 stores node identifiers and commit ticket numbers for updates that have been written through. Rep active standby table 354 stores node identifiers, roles, and timestamps for role changes of the active and the standby nodes.

Replication peers table 344 includes a plurality of entries, one entry for each of the active and/or standby nodes in the system. Each of the entries includes a node identifier and an associated (most recently recorded with a corresponding commit of a written-through update) CTN of the node. According to various embodiments, a replication peers table is maintained on one or more of the active node (such as node X 121 of FIG. 2), the standby node (such as node Y 123 of FIG. 2), and the backend database system (such as database 110 of FIG. 2). Of course, as the replication peers table is updated in conjunction with writethrough updates, the multiple versions of the replication peers table are not necessarily identical. For example, a version of the replication peers table on the standby node has a more recent entry (with a more recent CTN) than a version of the replication peers table on the backend database system (to which a writethrough update including the more recent CTN is in progress).

Maintaining a version of the replication peers table on the backend database system enables any node in the system (having an entry in the replication peers table) to find a last one of the node's CTNs (that made it to the backend database system), as well as a latest CTN (that made it to the backend database system) of other nodes in the system. For example, after a failure of the standby node, the active node is able to determine from the replication peers table on the backend database system which of the active node's updates were successfully written through to the backend database system, and thus which of the active node's updates must be written through again (because they were lost when the standby node failed). In some embodiments, maintaining a copy of the replication peers table on the standby node enables recovery of the active node (in a similar fashion to recovery of the standby node above) without a need for the active node to communicate with the backend database system. In further embodiments, maintaining a version of the replication peers table on the active node enables more symmetric operation in event of a failure of the standby node.

Rep active standby table 354 includes a plurality of entries, one entry for each of the active and/or standby nodes in the system. In some embodiments, rep active standby table 354 is maintained on the backend database system. Each of the entries includes a respective node identifier identifying a particular one of the nodes, an associated role of the particular node, and a timestamp indicating when the particular node assumed that role. For example, entry 356 includes identifier (ID) 356.A, role 356.R, and timestamp 356.T. ID 356.A serves to identify a particular one of the nodes corresponding to entry 356. In some embodiments, ID 356.A identifies an agent on the particular node, for example a replication agent (such as replication agent 269.X of FIG. 2). Role 356.R is a field encoding a role of the particular node, such as "active" or "standby". In various embodiments, timestamp 356.T is a global timestamp. Use of a global timestamp, in some embodiments, enables the system to disambiguate multiple ones of the entries having a same role, as is possible after one of the nodes has failed. The one of the multiple entries having the latest timestamp is the one that actually has the role.

Figure 1B:
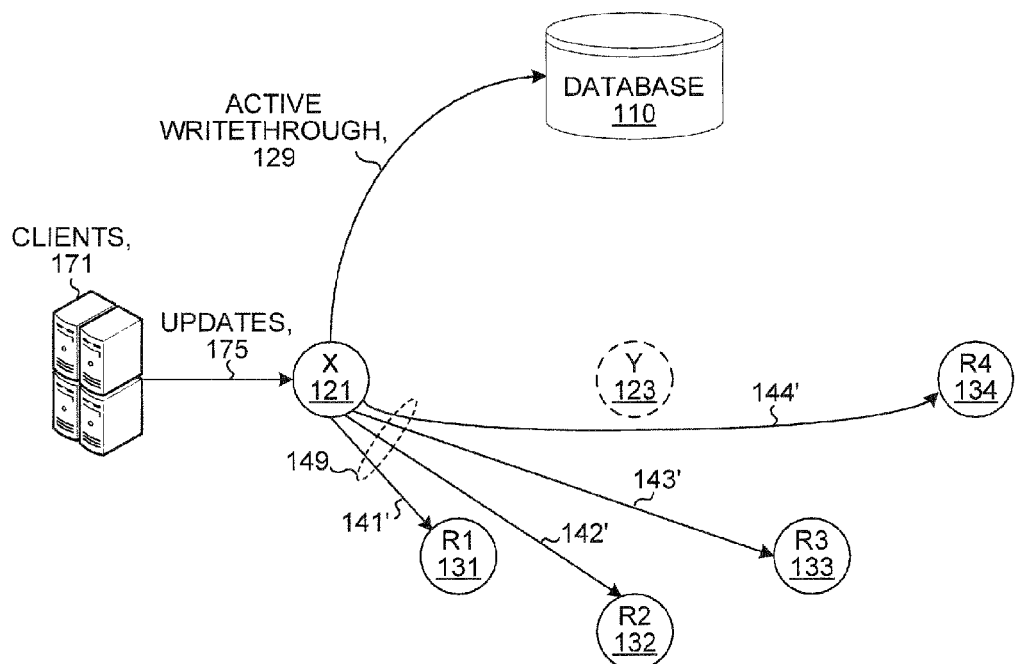
FIG. 1B illustrates selected details of the system of FIG. 1A highlighting primary connections after standby node failure.

FIG. 1B illustrates selected details of the system of FIG. 1A highlighting primary connections after standby node failure. The connections illustrated in FIG. 1B are a subset of the connections illustrated in FIG. 1A, and illustrate the connections remaining after node Y 123 (the standby node) fails.

In the event that the standby node fails, the active node takes over operations and/or connections of the standby node. As illustrated in FIG. 1B, propagation of updates to the replica nodes (R1 131, R2 132, R3 133, and R4 134) is taken over by the active node, with connection 141' replacing connection 141, connection 142' replacing connection 142, connection 143' replacing connection 143, and connection 144' replacing connection 144. Similarly, the path to database 110 (previously via node Y 123 using active writethrough updates 125 and standby writethrough updates 127) is replaced by node X 121 sending active writethrough updates 129 directly to database 110. In some embodiments, active writethrough updates 129 has a structure and/or format more similar to that of standby writethrough updates 127. For example, if database 110 has different interface requirements than node Y 123, such as when database 110 is a different type of database than the respective database of node Y 123, then active writethrough updates 129 matches the interface requirements of database 110 (and active writethrough updates 125 matches the interface requirements of node Y 123).

Recovery from failure of the standby node includes the active node taking over operations and/or connections of the standby node (as explained above), restarting some or all of the standby node (as necessary), and synchronizing the standby node with the active node (specifically, synchronizing contents of the respective databases). In some embodiments, the synchronizing use techniques such as one or more of: techniques explained above with regards to the master update list (MUL) and MUL locators; techniques explained above with regards to transaction logs, commit records, and commit ticket numbers; and techniques explained below with regards to change logs and bookmarks.

Figure 1C:
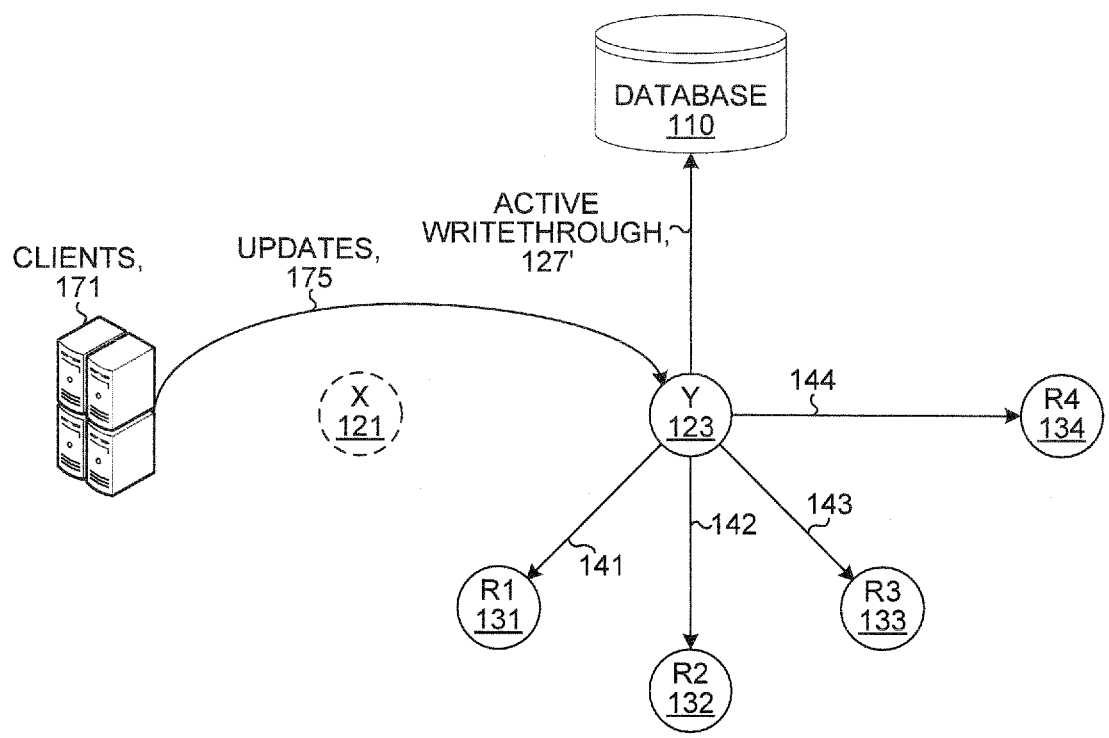
FIG. 1C illustrates selected details of the system of FIG. 1A highlighting primary connections after active node failure.

FIG. 1C illustrates selected details of the system of FIG. 1A highlighting primary connections after active node failure. The connections illustrated in FIG. 1C are a subset of the connections illustrated in FIG. 1A, and illustrate the connections remaining after node X 121 (the active node) fails.

In the event that the active node fails, the standby node takes over operations and/or connections of the failed active node, and in some embodiments assumes the active role. Comparing FIGS. 1B and 1C, the remaining connections in both are similar, and one difference is whether the remaining node is node X 121 or node Y 123.

As illustrated in FIG. 1C, updates 175 from clients 171 are redirected to node Y 123, bypassing node X 121. Standby writethrough updates 127 is replaced by active writethrough updates 127'. While both standby writethrough updates 127 and active writethrough updates 127' are directed to database 110, standby writethrough updates 127 includes information sent by node X 121, such as a commit ticket number of node X for each update, that is not present in active writethrough updates 127'.

Recovery from failure of the active node includes the standby node taking over operations and/or connections of the active node (as explained above), restarting some or all of the failed active node (as necessary), and synchronizing the failed active node with the new active node (specifically, synchronizing contents of the respective databases). In some embodiments, the synchronizing use techniques such as one or more of: techniques explained above with regards to the master update list (MUL) and MUL locators; techniques explained above with regards to transaction logs, commit records, and commit ticket numbers; and techniques explained below with regards to change logs and bookmarks.

Figure 4A:
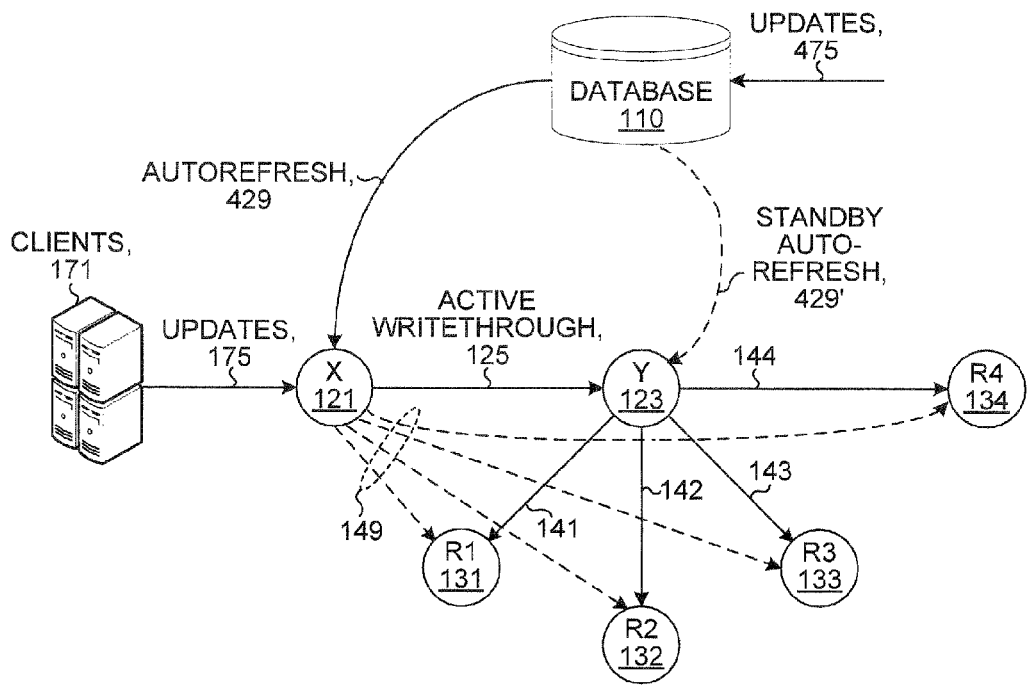
FIG. 4A illustrates selected details of an embodiment of a system with active and standby nodes highlighting autorefresh connections.
Figure 4B:
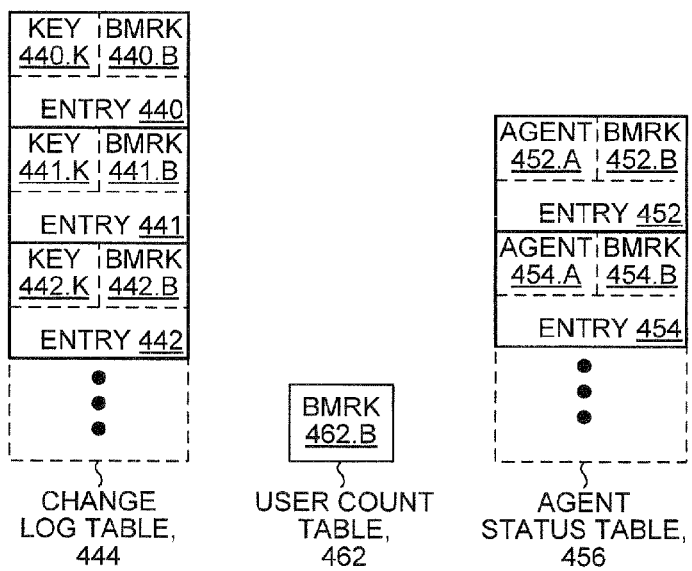
FIG. 4B illustrates selected details of embodiments of database tables used with autorefresh.

FIG. 4A illustrates selected details of an embodiment of a system with active and standby nodes highlighting autorefresh connections. FIG. 4A is similar to FIG. 1A with the addition of a source of updates, updates 475, applied directly to database 110. (Further, FIG. 4A does not illustrate some of the writethrough connections in FIG. 1A to lessen crowding of the drawing.) According to various embodiments, updates 475 are sourced by one or more of clients 171; by any other clients or other computer systems: and by any combination thereof.

In some embodiments, a system is enabled to update database tables via one or more of: database 110 using updates 475; and an active node (such as node X 121) using updates 175. In further embodiments, a same database table (or in still further embodiments, a same cache group) is only updatable by one or the other of updates 475 and updates 175.

In various embodiments, database 110 is a same or a similar database to that of node X 121. In such a case, autorefresh 429 is able to use active writethrough to update the respective database of node X 121, and active writethrough 125 is a standby writethrough connection.

In other embodiments, database 110 is not able to perform active writethrough. For example, in some usage scenarios, database 110 is a large, commercial database system that does not support active writethrough. In these cases, updates 475 applied to database 110 are communicated to node X 121 by autorefresh. All updates received by node X 121 as the active node, whether from clients 171 or from database 110 with autorefresh, are treated similarly. For example, the updates are written through to node Y 123 using active writethrough, and are similarly written through (by one or more of node X 121 and node Y 123) to the replica nodes (R1 131, R2 132, R3 133, and R4 134 as illustrated in FIG. 1A). One difference, however, is that updates 475 are not sent to database 110 as standby writethrough updates (since updates 475 have already been applied to database 110). For at least this reason, in some embodiments, updates sent via active writethrough 125 include an indication of the source (clients 171 or database 110) and/or the type (direct or autorefresh) of the update. In addition, autorefresh updates received at node X 121 are treated differently than updates from clients 171 in the event of the failure of the active node (node X 121, as illustrated in FIG. 4A) or the standby node (node Y 123, as illustrated in FIG. 4A). For example, in some embodiments, a type of master update list called a change log table (as illustrated by change log table 444 in FIG. 4B) is used as part of recovery from a failure of the active node or of the standby node.

In some embodiments, connections used in the event of a failure of either of node X 121 or of node Y 123 are similar to those illustrated in and described with regard to FIGS. 1B and 1C. In further embodiments, a failure of node X 121 (the active node, as illustrated in FIG. 4A) breaks connection autorefresh 429 from database 110. When node Y 123 (the standby node, as illustrated in FIG. 4A) takes over operations and/or connections of the failed active node (as explained with regard to FIG. 1C), node Y 123 also takes over the connection to database 110 for autorefresh updates, using standby autorefresh 429'.

FIG. 4B illustrates selected details of embodiments of database tables used with autorefresh. In some embodiments and/or usage scenarios, database 110 is configured to update and/or to access change log table 444, agent status table 456, and user count table 462. In further embodiments, one or more of change log table 444, agent status table 456, and user count table 462 is updated and/or accessed by the active node (such as node X 121 as illustrated in FIG. 4A) or by the standby node (such as node Y 123 as illustrated in FIG. 4A).

In some embodiments, change log table 444 includes a plurality of entries, such as entry 440, entry 441, and entry 442. Each entry includes a key, such as key 440.K in entry 440, and a bookmark, such as bookmark 440.B. In further embodiments, each entry includes other fields, such as a table identifier or a cache group identifier. In various embodiments, change log table 444 is a table of database 110. In some embodiments, change log table 444 is a type of master update list for updates applied to database 110, with database 110 acting as the master node. Further, the bookmarks (such as bookmarks 440.B, 441.B, and 442.B) are MUL locators for change log table 444.

In some embodiments, user count table 462 stores a single bookmark 462.B, indicating a last bookmark used to update bookmarks stored in the entries of change log table 444. In various embodiments, user count table 462 is a table of database 110. An example of using change log table 444 and user count table 462 is described below with regard to FIGS. 5A and 5B.

In some embodiments, agent status table 456 includes a plurality of entries, such as entry 452 and entry 454. Each entry includes an agent identifier and a bookmark, such as agent identifier 452.A and bookmark 452.B in entry 452. According to various embodiments, the agent identifier is one or more of: a node identifier; and an identifier of an agent running on a node. A particular one of the bookmarks stored in one of the entries of agent status table 456 corresponds to one of the bookmarks in change log table 444 whose associated updates have been already been applied by an agent identified by the agent identifier of the entry to the respective database of the node on which the identified agent runs. In various embodiments, agent status table 456 is a table of database 110.

In some embodiments, when selected tables (such as tables in cache groups configured to be autorefreshed) in database 110 are updated, a respective entry is added to change log table 444 for each updated row, the respective entry storing the respective key of the updated row and having an empty bookmark. In further embodiments, the entries are added by a respective trigger on each of the selected tables, the respective trigger activating when the selected table is updated. In still further embodiments, the use of triggers enables the adding of a particular one of the entries to be part of a same transaction as used to update one of the selected tables. According to various embodiments, change log table 444 is one or more of: global for all tables, and stores a table identifier; global for all cache groups, and stores a cache group identifier; specific to a cache group, with zero or more other change log tables for other cache groups; and specific to a table, with zero or more other change log tables for other tables. In some embodiments and/or usage scenarios, a same key is stored in multiple entries in change log table 444, such as when a same row of a same table is updated multiple times.

FIGS. 5A and 5B illustrate an example of use of a change log table and of a user count table. FIG. 5A illustrates an example of change log table 444 after a number of keys (more than illustrated in FIG. 4B) have been added to change log table 444. FIG. 5B illustrates an example of a result of applying bookmarks to change log table 444 as illustrated in FIG. 5A.

As illustrated in FIGS. 5A and 5B, change log table 444 includes entries 440-445 having corresponding keys KEY0, KEY, . . . , KEY5. Further, entries 440, 442, and 443 have corresponding bookmarks 17, 17, and 16. User count table 462 stores bookmark 17, the largest bookmark applied so far to change log table 444. Entries with an empty bookmark, such as entries 441, 444, and 445, correspond to entries added to change log table 444 that have not yet had bookmarks applied.

In some embodiments, there is no determined order to the entries of change log table 444. For example, in some embodiments, entries are added in response to triggers, such as update triggers, when selected tables are updated as part of transactions, but the updates (including the entries added to change log table 444) are not visible (outside of the transaction) until the transaction is committed. Hence, a later-added one of the entries is, in some usage scenarios, visible prior to an earlier-added entry.

In some embodiments, bookmarks are applied to change log table 444 by an agent, such as a cache agent (for example, cache agent 267.X as illustrated in FIG. 2). The cache agent sends a bookmark transaction, such as in the form of an SQL statement, to database 110. The bookmark transaction is configured to perform a sequence of operations, including: determining entries of change log table 444 that have an empty bookmark; accessing user count table 462 to determine a last-used bookmark; incrementing the last-used bookmark; applying the incremented bookmark to all of the determined entries of change log table 444; and storing the incremented bookmark in user count table 462. In further embodiments, the bookmark transaction is atomic, and only one node and/or one agent is enabled to apply bookmarks to change log table 444 at a time. For example, a lock, such as a semaphore, is used to control access to change log table 444 (and user count table 462) for the purpose of applying bookmarks. In some embodiments, multiple cache agents, such as a cache agent on an active node and a cache agent on a standby node (such as cache agents 267.X and 267.Y as illustrated in FIG. 2) periodically apply bookmarks to change log table 444. In some embodiments, having more than one cache agent on more than one node apply bookmarks ensures that failure of a single node does not stop the application of bookmarks to change log table 444.

Applying bookmarks to change log table 444 (and using user count table 462) as illustrated in FIG. 5A yields change log table 444 (and user count table 462) as illustrated in FIG. 5B. As illustrated in FIG. 5B, the bookmark stored in user count table 462 has been incremented, and the entries of change log table 444 as illustrated in FIG. 5A with empty bookmarks have been filled with the (new) last-used bookmark stored in user count table 462.

Of course, in other embodiments, bookmarks are other than sequential numbers. For example, in various embodiments, bookmarks are one or more of: sequentially increasing numbers; monotonically increasing numbers; sequentially decreasing numbers; monotonically decreasing numbers; and any other ordered sequence of numbers or symbols.

In some embodiments where backend database system 110 is enabled to use commit triggers, bookmarks are applied directly to the entries of change log table 444 as the entries are added. In these embodiments, the transitory state illustrated in FIG. 5A where some of the bookmark numbers are empty does not exist, and there is no need to separately apply bookmarks to already-added entries as described above.

Returning to FIGS. 4A and 4B, in some embodiments, updates previously applied to database 110 are autorefreshed to node X 121 (or another node, such as another active node) using information from change log table 444 to determine which of the updates on database 110 are not present on node X 121. In some embodiments, autorefresh of a node is performed by a cache agent running on that node (such as cache agent 267.X as illustrated in FIG. 2). In these embodiments, the cache agent is a source of updates similar to a client (such as clients 171 as illustrated in FIG. 4A) or to an application (such as application 263.X as illustrated in FIG. 2).

Node X 121 (or one or more agents running on node X 121) maintains a last-applied bookmark, such as in a table similar to user count table 462. The last-applied bookmark corresponds to a bookmark value in change log table 444 such that updates to database 110 associated (such as by the respective key) with entries of change log table 444 having bookmark numbers less than or equal to the last-applied bookmark, have already been applied to the respective database of node X 121.

In some embodiments, autorefresh of the respective database of node X 121 from updates applied to database 110 is performed, at least in part, as an autorefresh transaction sent to database 110 to retrieve data (autorefresh updates) associated with keys of determined entries of change log table 444, where the determined entries are a subset of the entries having a bookmark number greater than the last-applied bookmark number. In some embodiments, the determined entries include ones of the entries having an empty (not-yet-applied in change log table 444) bookmark number, as the entries having an empty bookmark number correspond to completed transactions, and excluding them produces an inconsistent view of a current state of database 110. In further embodiments, a particular one of the entries having an empty bookmark number is considered in more than one autorefresh update, a first autorefresh update when the particular entry has an empty bookmark number, and a second autorefresh update after a bookmark has been applied to the particular entry.

In some embodiments, the autorefresh transaction is a join that selects entries from change log table 444 having a bookmark number greater than the last-applied bookmark number (and additionally, in further embodiments, having an empty bookmark number), and then uses keys of the selected entries to return rows of tables (or cache groups) associated with change log table 444 and having the selected keys. Continuing the example, the autorefresh transaction is also configured to return one or more of: the bookmark (or the largest bookmark) associated with each of the keys; the largest bookmark in change log table 444; and the bookmark stored in user count table 462. In various embodiments and/or usage scenarios, multiple entries in change log table 444 selectively have a same key, and the transaction returns a latest value of rows of the tables (or the cache groups) associated with change log table 444 and having the selected same key. In other words, data retrieved from database 110 in this fashion reflects a latest contents (e.g., a snapshot) of database 110, and some intermediate states of database 110 are never autorefreshed to (and thus never present in) node X 121.

In some embodiments, node X 121 performs autorefresh as a sequence of operations performed, at least in part, on node X 121, using the respective database of node X 121 and database 110. In various embodiments, the sequence of operations is a transaction. In further embodiments, the sequence of operations is atomic. The sequence of operations includes: determining a last-applied bookmark; sending an autorefresh transaction to database 110 to retrieve autorefresh updates (such as from recent updates to database 110) according to the last-applied bookmark; applying (such as by updating) the autorefresh updates to the respective database of node X 121; and setting the last-applied bookmark to a largest bookmark number returned by the autorefresh transaction. In further embodiments, the sequence of operations also includes updating an entry in agent status table 456 with the last-applied bookmark number. In various embodiments, after the sequence of operations, or as a part of the sequence of operations, the autorefresh updates are written through from node X 121 to node Y 123 (for example, from an active node to a standby node), and optionally and/or selectively to one or more replica nodes (such as replica nodes R1 131, R2 132, R3 133, and R4 134 as illustrated in FIG. 1A). The written-through autorefresh updates include the largest bookmark number returned by the autorefresh transaction.

A node, such as node Y 123 (or, in some embodiments, such as a replica node), receiving written-through autorefresh updates (along with a largest bookmark number associated with the updates), performs a sequence of operations similar to that described above for node X 121, with one difference being the source of the updates (and accordingly, no need to send an autorefresh transaction to retrieve the updates). For example, in some embodiments, a node receiving a written-through autorefresh updates (along with a largest bookmark number associated with the updates) performs a sequence of operations such as: applying (such as by updating) the written-through autorefresh updates to the respective database of the node; setting a last-applied bookmark to the largest bookmark number; and updating an entry in agent status table 456 with the last-applied bookmark number. In further embodiments, the sequence of operations on a standby node (such as node Y 123) also includes writing through the written-through autorefresh updates optionally and/or selectively to one or more replica nodes (such as replica nodes R1 131, R2 132, R3 133, and R4 134 as illustrated in FIG. 1A).

In some embodiments, replica nodes do not update an entry in agent status table 456 when applying a written-through autorefresh updates. In such embodiments, a particular one of the replica nodes is synchronized (after a failure of the particular replica node) with the active node and/or the standby node using techniques similar to those used with active writethrough. For example, in some embodiments, the written-through autorefresh updates have commit ticket numbers, and (for the replica nodes) are treated similarly to client updates (such as updates 175, as illustrated in FIG. 1A). In other embodiments, the replica nodes use techniques similar to those described below for the active node and the standby node to recover from a failure.

In some embodiments, agent status table 456, as illustrated in FIG. 4B, is used, at least in part, to provide information for garbage collecting (removing no longer needed entries from) change log table 444. Since agent status table 456 is updated by each of the nodes with a largest bookmark number corresponding to autorefresh updates applied at the node, the minimum bookmark number stored in agent status table 456 corresponds to a minimum bookmark number that has been applied at all of the nodes (at least, at all of the nodes updating agent status table 456).

In some embodiments, a change log table garbage collection process runs on one or more of the nodes, such as on the active node and/or on the standby node. Running the change log table garbage collection process on more than one node enables change log table garbage collection to continue in the event of failure of a single node.

In some embodiments, the change log table garbage collection performs a sequence of operations using database 110. In various embodiments, the sequence of operations is a transaction. In further embodiments, the sequence of operations is atomic. The sequence of operations includes: determining a minimum bookmark number stored in entries of agent status table 456; and removing any entries in change log table 444 having a bookmark number less than or equal to the minimum bookmark number.

In some embodiments, recovery from failure of either the active node (such as node X 121 as illustrated in FIG. 4A) or the standby node (such as node Y 123) as illustrated in FIG. 4A) is similar to the techniques described above with regard to FIGS. 1B and 1C. One difference is in synchronization of autorefresh updates, for which database 110 is the master node. If one of the active node or the standby node fails, the failing node is enabled to synchronize with latest ones of the autorefresh updates by performing a sequence of operations. In various embodiments, the sequence of operations is a transaction. In further embodiments, the sequence of operations is atomic. The sequence of operations includes: determining a last-applied bookmark number of the failed node; performing a transaction similar to an autorefresh transaction to retrieve autorefresh updates associated with keys of determined entries of change log table 444, where the determined entries are a subset of the entries having a bookmark number greater than the last-applied bookmark number (and additionally, in further embodiments, having an empty bookmark number); applying (such as by updating) the autorefresh updates to the respective database of the failed node; setting the last-applied bookmark to a largest bookmark number returned by the transaction; and, in some embodiments, updating an entry in agent status table 456 with the last-applied bookmark number. According to various embodiments, the last-applied bookmark number of the failed node is one or more of: stored in a table on the failed node; and stored in an entry (corresponding to the failed node or to an agent of the failed node) of agent status table 456.

Figure 6:
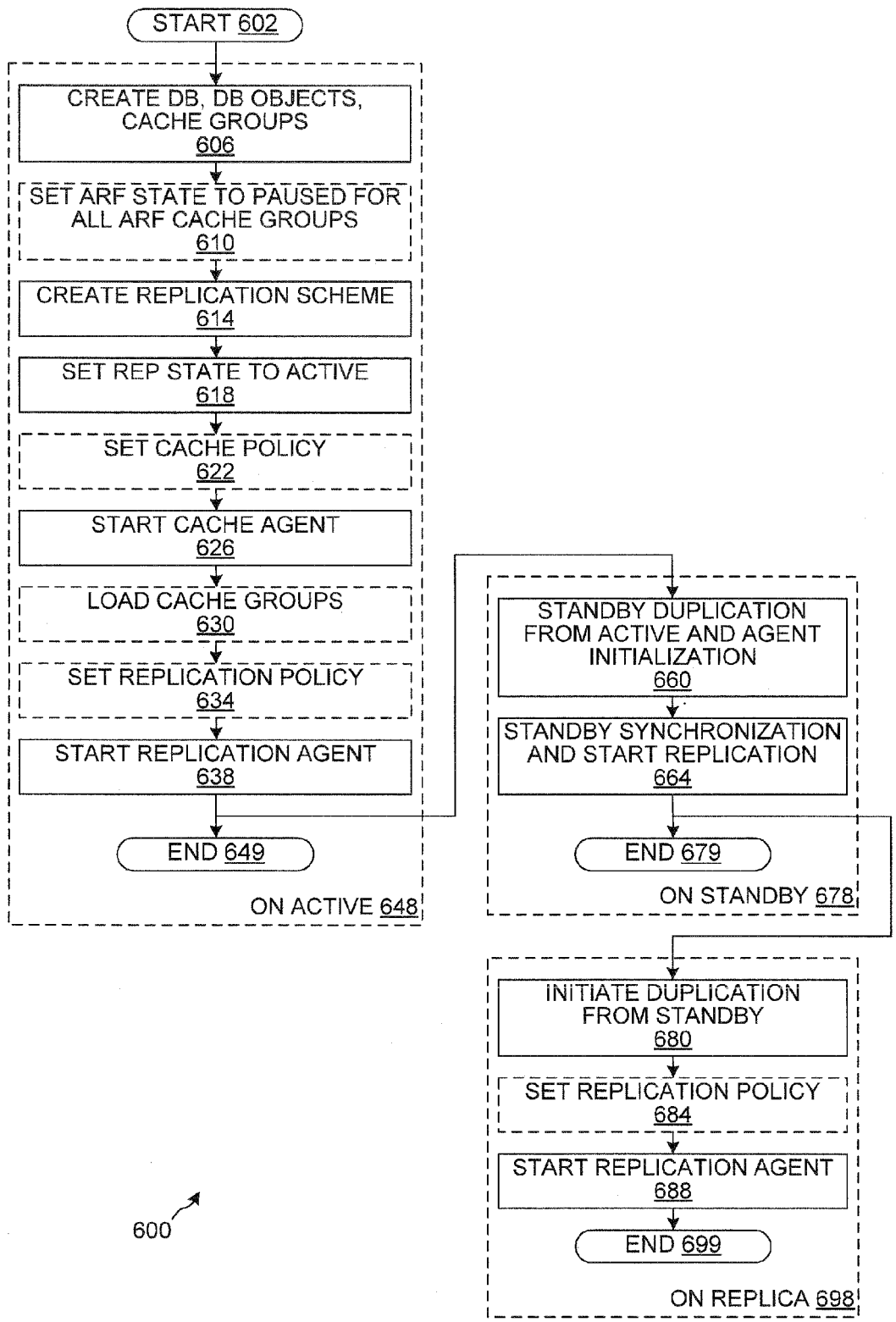
FIG. 6 illustrates an embodiment of a process for initializing a system with active and standby nodes.
Figure 7:
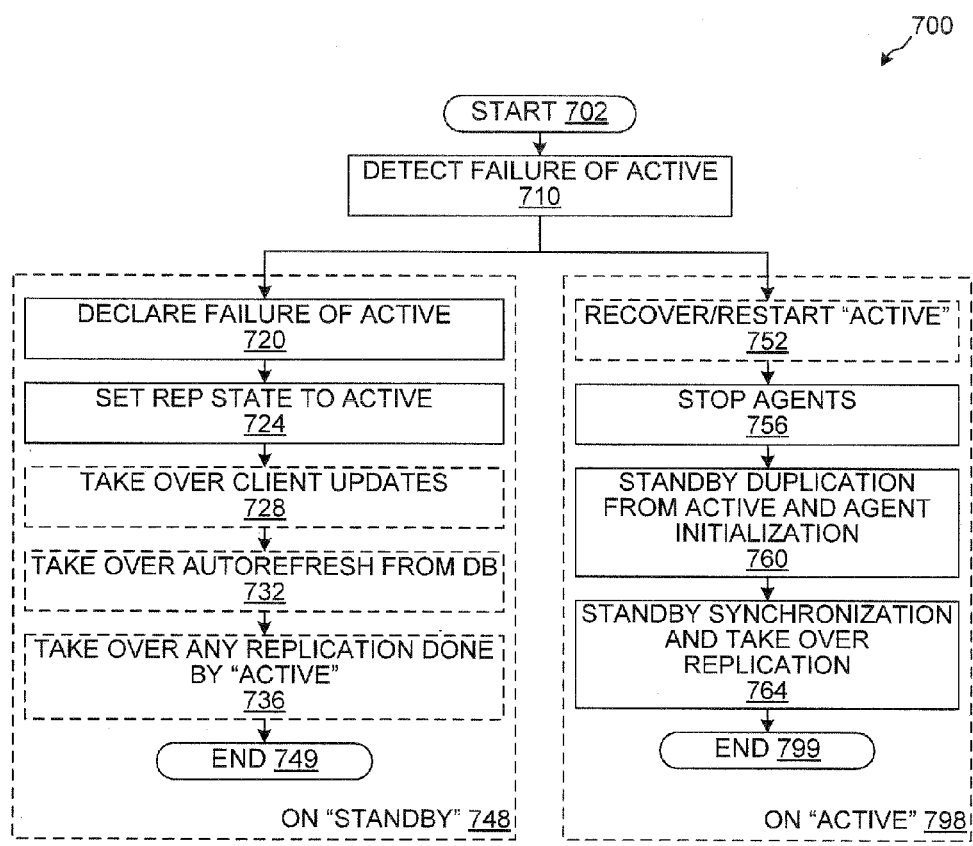
FIG. 7 illustrates an embodiment of a process for recovering a system with active and standby nodes from failure of the active node.
Figure 8:
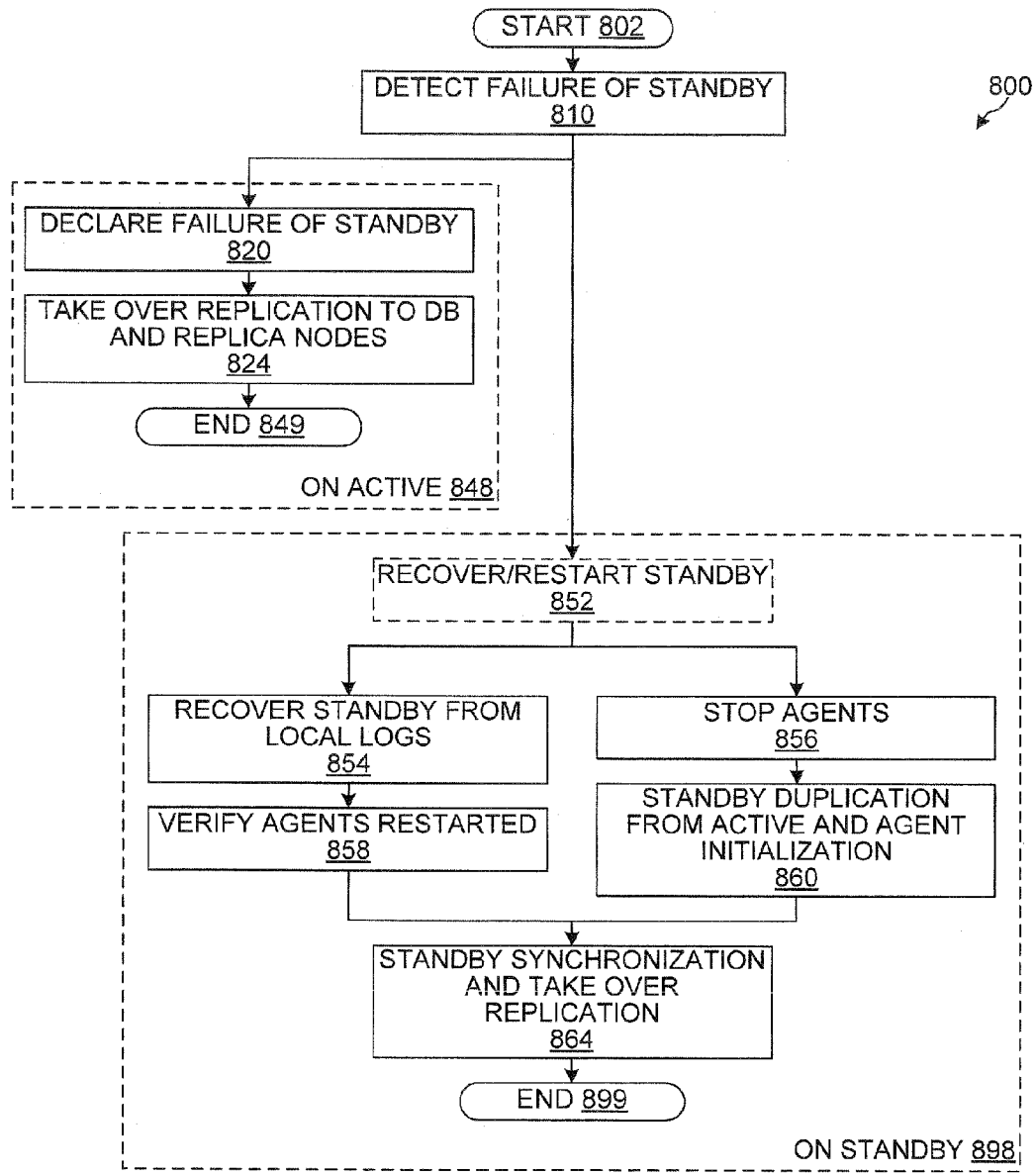
FIG. 8 illustrates an embodiment of a process for recovering a system with active and standby nodes from failure of the standby node.
Figure 9A:
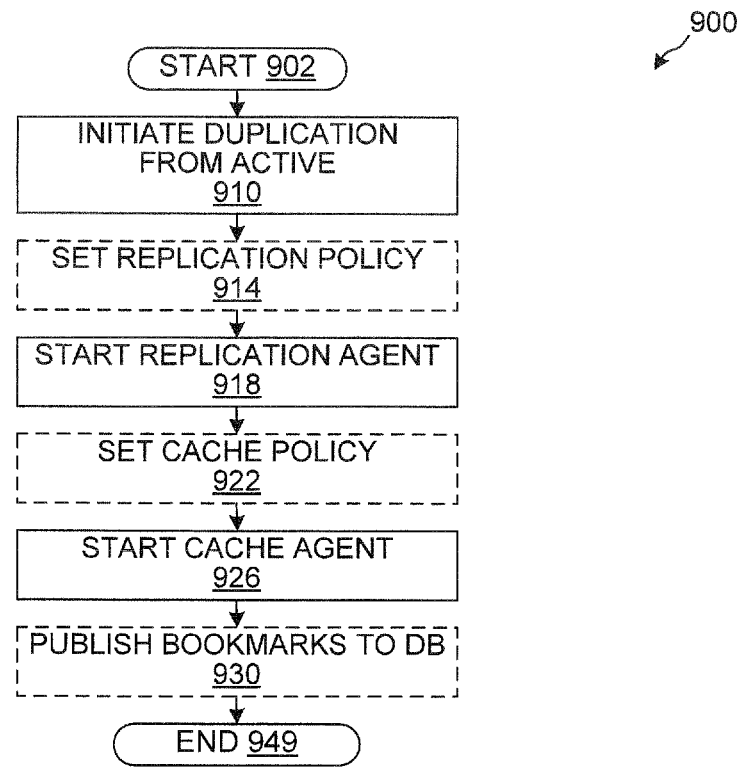
FIGS. 9A and 9B illustrate an embodiment of sub-processes used in FIGS. 6-8.
Figure 9B:
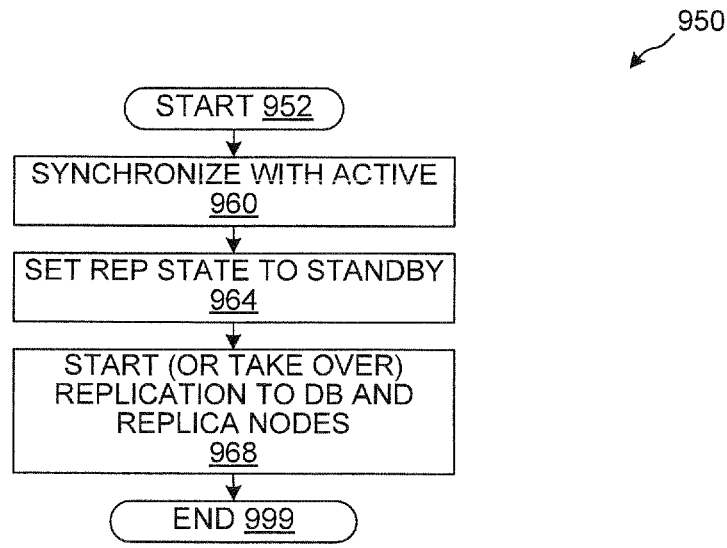

FIG. 6 illustrates an embodiment of a process for initializing a system with active and standby nodes. FIG. 7 illustrates an embodiment of a process for recovering a system with active and standby nodes from failure of the active node. FIG. 8 illustrates an embodiment of a process for recovering a system with active and standby nodes from failure of the standby node. FIGS. 9A and 9B illustrate an embodiment of sub-processes used in FIGS. 6-8.

In some embodiments, operations of the processes in FIGS. 6-8, 9A and 9B (other than for "START" and "END" indications), are, unless otherwise stated, performed and/or initiated by one or more of a user (such as an operator or administrator of a system), or by a cluster manager (such as cluster manager 181 as illustrated in FIG. 1A). In further embodiments, operations performed by the cluster manager are initiated by a user and/or are a result of a script or other program run on the cluster manager. For example, in some embodiments, detecting the failure of the active node ("DETECT FAILURE OF ACTIVE" 710, as illustrated in FIG. 7) is performed by the user (such as by detecting a lack of a response from the active node), while in other embodiments, detecting the failure of the active node is performed by the cluster manager (such as by detecting a lack of a heartbeat from the active node).

In FIGS. 6-8, 9A and 9B, some state transitions are illustrated for a respective replication state of the active node and the standby node, for example as illustrated in FIG. 6 ("SET REP STATE TO ACTIVE" 618). In some embodiments, the replication state of a node indicates a current role of the node, and is one of idle, standby and active. In further embodiments, a default value of the replication state of a node, such as after the node is recovered/restarted and/or initialized, is idle. (Initializations of the replication state of a node to idle after the node is recovered/restarted and/or initialized are not illustrated in FIGS. 6-8, 9A and 9B.) In various embodiments, the replication state of a node assumes other values, including one or more of failed (such as when a failure of the node is detected); and recovering (such as when the node is in the process of recovering from a failure). In some embodiments, the replication state of a node is global for the node, while in other embodiments, the replication state is per cache group or per table.

In various embodiments, the replication state of a node is controllable, at least in part, by a user and/or by a cluster manager. For example, in some embodiments, a user is able to provide a command, such as via a console or via a web browser interface to the cluster manager, to change the replication state of the active node from active to idle. In various embodiments, not all state transitions of the replication state are directly controllable. For example, in some embodiments and/or usage scenarios, the state transition of the replication state of a node from idle to active is able to be initiated by a user, and is performed using a process similar to parts of process 600 as illustrated in FIG. 6.

In some embodiments, the active node and the standby node have a respective autorefresh state selected from one of off, paused, and on. In some embodiments, the respective autorefresh state of a node is global for the node, while in other embodiments, the autorefresh state is controllable per cache group. The autorefresh state indicates whether the node (or, in various embodiments, whether a particular cache group of the node) is participating in autorefresh. A node with an autorefresh state of on (for a particular cache group) is able to control and/or to receive autorefresh updates (for the particular cache group) from the backend database system. A node with an autorefresh state of paused (for a particular cache group) is a standby for a corresponding node with an autorefresh state of on (for the particular cache group). In further embodiments, only one node (or only one node for each cache group) is able to have an autorefresh state of on. In some embodiments, a default value of the autorefresh state of a node (or each cache group of the node), such as after the node is recovered/restarted and/or initialized, is off. Initializations of the autorefresh state of a node (or each cache group of the node) to off after the node is recovered/restarted and/or initialized are not illustrated in FIGS. 6-8, 9A and 9B.

In various embodiments, the autorefresh state of a node (or each cache group of the node) is controllable, at least in part, by a user and/or by a cluster manager. For example, in some embodiments, a user is able to provide a command, such as via a console or via a web browser interface to the cluster manager, to change the autorefresh state of the active node (or of selected cache groups of the active node) from on to off. In various embodiments, not all state transitions of the autorefresh state are directly controllable. For example, in some embodiments, the state transition of the autorefresh state of a node (or of selected cache groups of the active node) from off to on is able to be initiated by a user, and is performed using a process similar to parts of process 600 as illustrated in FIG. 6. In various embodiments, the autorefresh state of a node (or of a particular cache group of the node) is related to the replication state of the node, as illustrated by the table below. In some embodiments, transitions of the replication state of a node affect the autorefresh state of the node (or of the particular cache group). For example, a node having a replication state transition from idle to active also transitions a autorefresh state of the node (or of the particular cache group) from paused to on (as illustrated in the first group of three rows in the table below). In various embodiments, the autorefresh state of the node (or of the particular cache group) is off unless the node (or the particular cache group) is configured for autorefresh.

| Old Replication State | New Replication State | Old Autorefresh State | New Autorefresh State | Notes |
|---|---|---|---|---|
| IDLE | ACTIVE | OFF | OFF | |
| | | PAUSED | ON | |
| | | ON | — | Not possible |

| Old Replication State | New Replication State | Old Autorefresh State | New Autorefresh State | Notes |
|---|---|---|---|---|
| IDLE | STANDBY | OFF | OFF | |
| | | PAUSED | PAUSED | |
| | | ON | — | Not possible |
| ACTIVE | IDLE | OFF | OFF | |
| | | PAUSED | PAUSED | |
| | | ON | PAUSED | |
| STANDBY | IDLE | OFF | OFF | |
| | | PAUSED | PAUSED | |
| | | ON | — | Not possible |

With reference to the table above, transitions from replication states of active or standby to idle occur, in some embodiments and/or usage scenarios, as part of recovery from a failure, or in response to a request, such as from a user and/or a cluster manager. Transitions from replication states of idle to active occur, in some embodiments and/or usage scenarios, when a node becomes the active node, such as when the standby node becomes the active node after failure of the active node. Transitions from replication states of idle to standby occur, in some embodiments and/or usage scenarios, when the standby node has synchronized with the active node (such as illustrated in FIG. 9B).

With regard to FIGS. 6-8, 9A and 9B, some of the transitions of the respective autorefresh state of the active node and the standby node (or of cache groups on the active node and the standby node) are illustrated (such as "SET ARF STATE TO PAUSED FOR ALL ARF CACHE GROUPS" 610, as illustrated in FIG. 6), and at least some of others of the transitions of the respective autorefresh state are, in some embodiments, given by the table above.

Sub-process 900 illustrated in FIG. 9A is performed on the standby node (such as node Y 123 as illustrated in FIG. 1A). Sub-process 900 performs duplication of state from the active node (such as node X 121 as illustrated in FIG. 1A) and initialization of some agents of the standby node.

Sub-process 900 starts ("START" 902) and begins by duplicating state from the active node to the standby node ("INITIATE DUPLICATION FROM ACTIVE" 910). According to various embodiments, the duplicated state includes one or more of: configuration of the respective database of the active node; configuration of objects; configuration of cache groups; replication schemes; contents of the respective database of the active node; and other state and/or control information of the active node. In some embodiments, a garbage collector thread of a cache agent is blocked to prevent the garbage collector thread form purging entries in a change log table (such as change log table 444 as illustrated in FIG. 4B) during duplication.

Next, a replication policy is optionally and/or selectively set ("SET REPLICATION POLICY" 914), and a replication agent is started ("START REPLICATION AGENT" 918). In some embodiments, a default replication policy is used if one is not explicitly set. According to various embodiments, a replication agent is configurable, via the replication policy, for one or more of: automatic or manual restart; specification of cache groups or tables that are replicated; a heartbeat interval; a frequency of garbage collecting; and other configuration parameters. In various embodiments, prior to starting the replication agent, a storage manager (such as storage manager 213.Y as illustrated in FIG. 2) initializes a replication state of the standby node to idle. The replication agent, in some embodiments, includes a transmitter thread (such as for writing-through updates and/or for transmitting acknowledgments), and a receiver thread (such as for receiving written-through updates and/or acknowledgments).

Next, a cache policy is optionally and/or selectively set ("SET CACHE POLICY" 922), and a cache agent is started ("START CACHE AGENT" 926). In some embodiments, a default cache policy is used if one is not explicitly set. According to various embodiments, a cache agent is configurable, via the cache policy, for one or more of: automatic or manual restart; specification of cache groups or tables that are cached; a heartbeat interval; cache size parameters; cache aging parameters; and other configuration parameters.

According to various embodiments, a cache agent on a particular one of the nodes includes one or more threads, such as one or more of: a marker thread to apply bookmarks to a change log table (such as change log table 444 as illustrated in FIG. 4B); a refresher thread to control autorefresh of the respective database of the particular node; a reporter thread to update an agent status table (such as agent status table 456 as illustrated in FIG. 4B) with a last-applied bookmark number; and a garbage collector thread to garbage collect the change log table. In further embodiments, some or all of these threads, such as the refresher thread, run solely on the cache agent on the active node.

Next, if autorefresh is enabled globally (or for any cache groups), bookmarks are published ("PUBLISH BOOKMARKS TO DB" 930) to the backend database system (such as database 110 as illustrated in FIG. 1A). In some embodiments, publishing the bookmarks includes updating an agent status table (such as agent status table 456 as illustrated in FIG. 4B) with a last-applied bookmark number (as described with reference to FIGS. 4A, 4B, 5A, and 5B). In various embodiments, the bookmarks are published by the cache agent, or by a reporter thread of the cache agent. In some embodiments, the last-applied bookmark number is provided by the active node along with corresponding updates as part of duplicating state from the active node to the standby node ("INITIATE DUPLICATION FROM ACTIVE" 910).

Sub-process 900 then returns ("END" 949) to a calling process (such as process 600 of FIG. 6).

Sub-process 950 illustrated in FIG. 9B is performed on the standby node (such as node Y 123 as illustrated in FIG. 1A). Sub-process 950 performs synchronization of the standby node with the active node (such as node X 121 as illustrated in FIG. 1A) and ends with the standby node assuming the standby role and taking over certain replication tasks from the active node.

Sub-process 950 starts ("START" 952) and begins by synchronizing state ("SYNCHRONIZE WITH ACTIVE" 960) between the active node and the standby node. According to various embodiments, the synchronizing includes one or more of: verifying that the standby node has completed duplicating state from the active node, and/or has completed recovering contents of the respective database of the standby node using local logs (such as illustrated by "RECOVER STANDBY FROM LOCAL LOGS" 854 in FIG. 8); using recovery techniques such as one or more of the techniques explained above with regards to the master update list (MUL) and MUL locators, with regards to transaction logs, commit records, and commit ticket numbers, and with regards to change logs and bookmarks; and other procedures to ensure that the standby node is ready to assume the standby role.

Next, a respective replication state of the standby node is set to standby ("SET REP STATE TO STANDBY" 964). In some embodiments, the replication state is set by a replication agent after the standby node is synchronized with the active node ("SYNCHRONIZE WITH ACTIVE" 960).

In some embodiments, setting the replication state of the standby node to standby enables the standby node (or, in various embodiments, a replication agent of the standby node, such as replication agent 269.Y of FIG. 2) to start and/or to take over certain tasks ("START (OR TAKE OVER) REPLICATION TO DB AND REPLICA NODES" 968). When sub-process 950 is performed at initialization of the system (such as with regard to FIG. 6), the standby node is now able to start the certain tasks and/or to take over at least some of the certain tasks from the active node (in the event that the active node has already started the at least some of the certain tasks). When sub-process 950 is performed as part of recovery from a failure, the standby node is now able to take over the certain tasks from the active node. In various embodiments, the certain tasks include one or more of: replication (write-through) to the replica nodes (such as replica nodes R1 131, R2 132, R3 133, and R4 134 as illustrated in FIG. 1A); replication (write-through) to the backend database system (such as via standby writethrough 127 as illustrated in FIG. 1A); and other tasks performed by the standby node. The standby node then assumes the standby role, and is operational as a standby for the active node.

Sub-process 950 then returns ("END" 999) to a calling process (such as process 600 of FIG. 6).

Process 600 as illustrated in FIG. 6 is initiated ("START" 602) on the active node (such as node X 121 as illustrated in FIG. 1A), and portions ("ON ACTIVE" 648) of process 600 are performed on the active node. Further portions ("ON STANDBY" 678, and "ON REPLICA" 698) of process 600 are performed on the standby node (such as node Y 123 as illustrated in FIG. 1A), and optionally on one or more of the replica nodes (such as replica nodes R1 131, R2 132, R3 133, and R4 134 as illustrated in FIG. 1A).

The portion of process 600 performed on the active node ("ON ACTIVE" 648) begins by initializing the respective database of the active node, such as by creating the database, associated objects and cache groups, and other similar initializations ("CREATE DB, DB OBJECTS, CACHE GROUPS" 606). In some embodiments, for each of the cache groups that is configured for autorefreshing, if any, an autorefresh state of the cache group is optionally set to paused ("SET ARF STATE TO PAUSED FOR ALL ARF CACHE GROUPS" 610). In various embodiments, the initial (creation-time) autorefresh state of a cache group is configurable. For example, some cache groups are created with an initial autorefresh state of off.

Next, a replication scheme is created ("CREATE REPLICATION SCHEME" 614). In some embodiments, a replication scheme describes (such as by hostname) the ones of the nodes that are involved in the active-standby replication. In further embodiments, the replication scheme also describes the replica nodes involved in the replication.

Next, a respective replication state of the active node is set to active ("SET REP STATE TO ACTIVE" 618). The active node then assumes the active role. In some embodiments, after setting the replication state to active, updates are allowed to the respective database of the active node, but the updates are not replicated (such as to the standby node or to the backend database system) until after a replication agent is started on the active node ("START REPLICATION AGENT" 638). In further embodiments, the updates are replicated to the standby node as part of synchronizing the standby node with the active node.

Next, a cache policy is set ("SET CACHE POLICY" 622), and a cache agent is started ("START CACHE AGENT" 626). In various embodiments, these operations are similar to those performed with respect to a cache agent on the standby node, as described with regard to FIG. 9A ("SET CACHE POLICY" 922, and "START CACHE AGENT" 926).

Next, cache groups of the respective database of the active node are optionally loaded ("LOAD CACHE GROUPS" 630). In various embodiments, cache groups are configured to load initially (such as in bulk), and/or to load dynamically (such as on-demand). Further, in some embodiments, cache groups are loadable under user control after a replication agent is started (after completing "START REPLICATION AGENT" 638). In various embodiments, loading a cache group on the active node (and, in further embodiments, when the replication state of the active node is on) automatically changes the autorefresh state of the cache group from paused to on.

Next, a replication policy is set ("SET REPLICATION POLICY" 634), and a replication agent is started ("START REPLICATION AGENT" 638). In various embodiments, these operations are similar to those performed with respect to a replication agent on the standby node, as described with regard to FIG. 9A ("SET REPLICATION POLICY" 914, and "START REPLICATION AGENT" 918). In some embodiments, after the replication agent is started, updates are replicated from the active node to the backend database system.

Process 600 then continues on the standby node, and the portion of process 600 on the active node ends ("END" 649).

The portion of process 600 performed on the standby node ("ON STANDBY" 678) begins by performing sub-process 900 as illustrated in FIG. 9A ("STANDBY DUPLICATION FROM ACTIVE AND AGENT INITIALIZATION" 660). Next, sub-process 950 as illustrated in FIG. 9B ("STANDBY SYNCHRONIZATION AND START REPLICATION" 664) is performed. After performing these sub-processes, the standby node is synchronized with the active node and has assumed the standby role.

Process 600 then optionally continues on one or more of the replica nodes, and the portion of process 600 on the standby node ends ("END" 679).

The portion of process 600 performed on a particular one of the one or more replica nodes ("ON REPLICA" 698) begins by duplicating state from the standby node to the particular replica node ("INITIATE DUPLICATION FROM STANDBY" 680). In various embodiments, this operation is similar to that performed with respect to duplicating from the active node to the standby node, as described with regard to FIG. 9A ("INITIATE DUPLICATION FROM ACTIVE" 910).

Next, a replication policy is set ("SET REPLICATION POLICY" 684), and a replication agent is started ("START REPLICATION AGENT" 688). In various embodiments, these operations are similar to those performed with respect to a replication agent on the standby node, as described with regard to FIG. 9A ("SET REPLICATION POLICY" 914, and "START REPLICATION AGENT" 918).

After performing these operations, the particular replica node is synchronized with the standby node and is able to receive and to process client queries.

The portion of process 600 on the particular replica node then ends ("END" 699).

Process 700 as illustrated in FIG. 7 is initiated ("START" 702), and begins by detecting a failure of the active node ("DETECT FAILURE OF ACTIVE" 710). In some embodiments, the failure of the active node (such as node X 121 as illustrated in FIG. 1A) is detected by a user and/or by a cluster manager (such as cluster manager 181 as illustrated in FIG. 1A). Since failure of the active node, in some embodiments, causes roles of the active node and the standby node (such as node Y 123 as illustrated in FIG. 1A) to switch, FIG. 7 illustrates portions of process 700 that are performed on the "active" node ("ON 'ACTIVE'" 798), meaning that these portions are performed on the failed active node (which becomes the standby node), and illustrates portions of process 700 that are performed on the "standby" node ("ON 'STANDBY'" 748), meaning that these portions are performed on the new active node (which was the standby node).

The portion of process 700 performed on the "standby" node ("ON 'STANDBY'" 748) begins by declaring the failure of the active node ("DECLARE FAILURE OF ACTIVE" 720), and by changing the replication state of the "standby" node to active ("SET REP STATE TO ACTIVE" 724). According to various embodiments, declaring failure of the active node includes one or more of: state changes on the "standby" node; state changes in other portions of the system (such as in cluster manager 181, as illustrated in FIG. 1A); and reporting of the failure of the active node. The "standby" node then assumes the active role. In some embodiments, after setting the replication state to active, updates are allowed to the respective database of the "standby" node, but the updates are not replicated to the "active" node until after a replication agent is started on the "active node" (as part of "STANDBY DUPLICATION FROM ACTIVE AND AGENT INITIALIZATION" 760, which performs sub-process 900 of FIG. 9A). In further embodiments, the updates are replicated as part of synchronizing the "active" node with the "standby" node. In some embodiments, updates optionally begin to be replicated from the "standby" node to the backend database system at this point.

Next, the "standby" node is able to take over various activities of the "active" node ("TAKE OVER CLIENT UPDATES" 728, "TAKE OVER AUTOREFRESH FROM DB" 732, and "TAKE OVER ANY REPLICATION DONE BY 'ACTIVE'" 736). Client updates, if any, such as updates 175 as illustrated in FIG. 1A, are redirected to the "standby" node (as illustrated in FIG. 1B). If autorefresh is configured for the standby node (or for any cache groups of the standby node), the "standby" node (or, in some embodiments, a cache agent of the "standby" node, such as cache agent 267.Y as illustrated in FIG. 2) takes over responsibility for autorefresh from the backend database system. If the "active" node was replicating (such as by writing through) updates to any of the replica nodes (such as replica nodes R1 131, R2 132, R3 133, and R4 134 as illustrated in FIG. 1A), the "standby" node (or in some embodiments, a replication agent of the "standby" node, such as replication agent 269.Y as illustrated in FIG. 2) takes over the replication.

The portion of process 700 on the "standby" node then ends ("END" 749).

In some embodiments, the portion of process 700 performed on the "active" node ("ON 'ACTIVE'" 798) begins in response to detecting a failure of the active node ("DETECT FAILURE OF ACTIVE" 710). In other embodiments, the portion of process 700 performed on the "active" node begins in response to and/or under control of one or more of: the "standby" node; a user; and the cluster manager. In various embodiments, some operations of the portion of process 700 performed on the "active" node are gated by operations on the "standby" node. For example, in some embodiments, duplication from the "standby" node ("STANDBY DUPLICATION FROM ACTIVE AND AGENT INITIALIZATION" 760) is gated by the "standby" node setting the replication state of the "standby" node to active ("SET REP STATE TO ACTIVE" 724). In some embodiments, the portion of process 700 performed on the "active" node begins after the "standby" node has completed the portion of process 700 performed on the "standby" node (after completing "TAKE OVER ANY REPLICATION DONE BY 'ACTIVE'" 736).

Operations to recover the failed active ("active") node begin by optionally and/or selectively recovering processing, processes, or other state of the "active" node ("RECOVER/ RESTART 'ACTIVE'" 752). In a first example, if the "active" node crashed, the "active" node is rebooted. In a second example, if a process on the "active" node failed, the process is restarted. Then, if there are still agents running on the "active" node (for example, if the "active" node did not crash), the agents are stopped ("STOP AGENTS" 756).

Process 700 then performs sub-process 900 as illustrated in FIG. 9A ("STANDBY DUPLICATION FROM ACTIVE AND AGENT INITIALIZATION" 760). Next, sub-process 950 as illustrated in FIG. 9B ("STANDBY SYNCHRONIZATION AND START REPLICATION" 764) is performed. After performing these sub-processes, the "active" node is synchronized with the "standby" node and has assumed the standby role.

In some embodiments, such as some embodiments where the "active" node has not crashed, rather than stopping agents and using sub-process 900 of FIG. 9A, the "active" node recovers state by recovering the respective database of the "active" node. In various embodiments, the "active" node uses operations similar to those illustrated in FIG. 8 to recover the respective database of the "active" node from local logs, and to verify that agents are active and/or have been restarted (such as "RECOVER STANDBY FROM LOCAL LOGS" 854, and "VERIFY AGENTS RESTARTED" 858, as illustrated in FIG. 8). In these embodiments, the "active" node still performs sub-process 950 as illustrated in FIG. 9B ("STANDBY SYNCHRONIZATION AND START REPLICATION" 764).

The portion of process 700 on the "active" node then ends ("END" 799).

Process 800 as illustrated in FIG. 8 is initiated ("START" 802), and begins by detecting a failure of the standby node ("DETECT FAILURE OF STANDBY" 810). In some embodiments, the failure of the standby node (such as node Y 123 as illustrated in FIG. 1A) is detected by a user and/or by a cluster manager (such as cluster manager 181 as illustrated in FIG. 1A).

The portion of process 800 performed on the active node ("ON ACTIVE" 848) begins by declaring the failure of the standby node ("DECLARE FAILURE OF STANDBY" 820). According to various embodiments, declaring failure of the standby node includes one or more of: state changes on the active node; state changes in other portions of the system (such as in cluster manager 181, as illustrated in FIG. 1A); and reporting of the failure of the standby node.

Next, the active node (or in some embodiments, a replication agent of the active node, such as replication agent 269.X as illustrated in FIG. 2) is able to take over various activities of the standby node ("TAKE OVER REPLICATION TO DB AND REPLICA NODES" 824). If the standby node was replicating (such as by writing through) updates to any of the replica nodes (such as replica nodes R1 131, R2 132, R3 133, and R4 134 as illustrated in FIG. 1A), then, in some embodiments, the active node (or in various embodiments, a replication agent of the active node, such as replication agent 269.X as illustrated in FIG. 2) takes over the replication. If the active node is receiving client updates (such as updates 175 as illustrated in FIG. 1A) and was writing through the updates (via active writethrough 125 as illustrated in FIG. 1A) to the standby node (which in, wrote through the updates to the backend database system via standby writethrough updates 127 as illustrated in FIG. 1A), then, in some embodiments, the active node (or in various embodiments, a replication agent of the active node) takes over the writing through to the backend database system (such as via active writethrough 129 as illustrated in FIG. 1B).

The portion of process 800 on the active node then ends ("END" 849).

In some embodiments, the portion of process 800 performed on the standby node ("ON STANDBY" 898) begins in response to detecting a failure of the standby node ("DETECT FAILURE OF STANDBY" 810). In other embodiments, the portion of process 800 performed on the standby node begins in response to and/or under control of one or more of: the active node; a user; and the cluster manager. In various embodiments, some operations of the portion of process 800 performed on the standby node are gated by operations on the active node. For example, in some embodiments, the standby is not able to resume replication ("STANDBY SYNCHRONIZATION AND TAKE OVER REPLICATION" 864) if the active node is still in the process of taking over for the failed standby ("TAKE OVER REPLICATION TO DB AND REPLICA NODES" 824). In some embodiments, the portion of process 800 performed on the standby node begins after the active node has completed the portion of process 800 performed on the active node (after completing "TAKE OVER REPLICATION TO DB AND REPLICA NODES" 824).

Operations to recover the failed standby node begin by optionally and/or selectively recovering processing, processes, or other state of the standby node ("RECOVER/RESTART 'ACTIVE'" 852). In a first example, if the standby node crashed, the standby node is rebooted. In a second example, if a process on the standby node failed, the process is restarted. The standby node then optionally and/or selectively uses one of two different paths to restore the respective database of the standby node.

In the first path, agents still running on the standby node, if any, are stopped ("STOP AGENTS" 856). Then, sub-process 900 as illustrated in FIG. 9A ("STANDBY DUPLICATION FROM ACTIVE AND AGENT INITIALIZATION" 860) is performed.

In the second path, the respective database of the standby node is recovered ("RECOVER STANDBY FROM LOCAL LOGS" 854) using local logs (such as transaction logs 251.Y and/or checkpoint files 253.Y as illustrated in FIG. 2). In various embodiments, the recovery is performed, at least in part, by a storage manager of the standby node (such as storage manager 213.Y as illustrated in FIG. 2). In further embodiments, the storage manager initializes a replication state of the standby node to idle. Then, operations are performed to verify that agents on the standby node are active and/or have been restarted, and agents are restarted as necessary ("VERIFY AGENTS RESTARTED" 858).

After using one of the two paths to restore the respective database of the standby node, sub-process 950 as illustrated in FIG. 9B ("STANDBY SYNCHRONIZATION AND START REPLICATION" 864) is performed. After performing this sub-process, the standby node is synchronized with the active node and has assumed the standby role.

The portion of process 800 on the active node then ends ("END" 899).

While the embodiments described above have been explained with an active and a standby node, other embodiments with one or more active nodes and or one or more standby nodes are within the scope of the teachings herein. For example, data structures, such as commit records, are extendable to have additional fields for recording commit information of additional nodes.

While the embodiments described above have been explained with regard to one respective database on each of the nodes, other embodiments with one or more respective databases on each of the nodes are within the scope of the teachings herein.

Embodiments of the system described above are enabled to use, to perform some or all of the operations described above, one or more of: dedicated processor systems; micro-controllers; programmable logic devices; microprocessors; and any combination thereof. According to various embodiments, some or all of the operations described above are implemented in one or more of: software, firmware; microcode; dedicated hardware; and any combination thereof.

For the sake of convenience, the operations are described as various interconnected functional blocks and/or distinct software modules. This is not necessary, however, and there are cases where one or more of these functional blocks or modules are equivalently aggregated into a single logic device, program, and/or operation with unclear boundaries. In any event, the functional blocks and/or software modules are implementable by themselves, or in combination with other operations, in either hardware and/or software.

Having described and illustrated the principles of the invention in representative embodiments thereof, it should be apparent that the invention may be modified in arrangement and detail without departing from such principles. We claim all modifications and variation coming within the spirit and scope of the following claims.

What is claimed is:

1. A computer-implemented method comprising steps of:
from one or more clients, an active node receiving first row updates for rows belonging to a cache group that are stored within an in-memory database of said active node, said cache group being defined as a set of rows of one or more base tables stored in a database of a disk-based primary database system;
said active node committing said first row updates to said in-memory database of said active node;
propagating the first row updates as first active write-through updates to a standby node;
said standby node receiving said first active write-through updates;
said standby node committing said first active write-through updates to an in-memory database of said standby node;
said standby node propagating the first active write-through updates to said disk-based primary database system to cause said disk-based primary database system to update rows belonging to said cache group in said database of said disk-based primary database system;
said active node receiving autorefresh row updates periodically propagated from said disk-based primary database system, said autorefresh row updates reflecting second row updates made to said cache group at said database of said disk-based primary database system, said second row updates being different than said first row updates;
said active node committing said autorefresh row updates to said in-memory database of said active node;
said standby node committing said autorefresh row updates to said in-memory database of said standby node; and
said standby node preventing reapplying said autorefresh updates to said disk-based database of said disk-based primary database system.

2. The method of claim 1, wherein the second row updates include a subset of row updates to a certain row in said database of said disk-based primary database system, the method further including the steps of:
said primary database system making a determination of a most recent row update of said subset of row updates,
only propagating an autorefresh row update for the most recent row update but not for other one or more row updates of said subset of row updates.

3. The method of claim 1, wherein said autorefresh row updates received by said active node are propagated by said standby node to said active node.

4. The method of claim 1, wherein the autorefresh row updates received by said active node are propagated by said active node to said standby node.

5. A non-transitory computer-readable medium storing one or more sequences of instructions, which, when executed by one or more processors, cause:
from one or more clients, an active node receiving first row updates for rows belonging to a cache group that are stored within an in-memory database of said active node, said cache group being defined as a set of rows of one or more base tables stored in a database of a disk-based primary database system;
said active node committing said first row updates to said in-memory database of said active node;
propagating the first row updates as first active write-through updates to a standby node;
said standby node receiving said first active write-through updates;
said standby node committing said first active write-through updates to an in-memory database of said standby node;
said standby node propagating the first active write-through updates to said disk-based primary database system to cause said disk-based primary database system to update rows belonging to said cache group in said database of said disk-based primary database system;
said active node receiving autorefresh row updates periodically propagated from said disk-based primary database system, said autorefresh row updates reflecting second row updates made to said cache group at said database of said disk-based primary database system, said second row updates being different than said first row updates;
said active node committing said autorefresh row updates to said in-memory database of said active node;
said standby node committing said autorefresh row updates to said in-memory database of said standby node; and
said standby node preventing reapplying said autorefresh updates to said disk-based database of said disk-based primary database system.

6. The non-transitory computer-readable of claim 5, wherein the second row updates include a subset of row updates to a certain row in said database of said disk-based primary database system, wherein the instructions further include instructions for:
said primary database system making a determination of a most recent row update of said subset of row updates,
only propagating an autorefresh row update for the most recent row update but not for other one or more row updates of said subset of row updates.

7. The non-transitory computer-readable of claim 5, wherein the one or more sequences of instructions further including instructions for the autorefresh row updates received by said active node to be propagated by said standby node.

8. The non-transitory computer-readable of claim 5, wherein the one or more sequences of instructions further include instructions for the autorefresh row updates received by said active node to be propagated by said active node to said standby node.

9. The method of claim 1, wherein data indicating that a source of said second row updates is not a client of said active node includes data indicating at least one of the following:
   said source of said second row updates is said disk-based primary database system; or said autorefresh row updates are of the autorefresh type.

10. The non-transitory computer-readable of claim 5, wherein data indicating that a source of said second row is not a client of said active node includes data indicating at least one of the following:
   said source of said second row updates is said disk-based primary database system; or said autorefresh row updates are of the autorefresh type.

11. The method of claim 1, wherein the steps further include said standby node propagating said first active write-through updates and said autorefresh row updates to one or more replica nodes.

12. The non-transitory computer-readable of claim 5, the instructions further including instructions for said standby node propagating said first active write-through updates and autorefresh row updates to one or more replica nodes.

* * * * *